United States Patent
Jossef et al.

(10) Patent No.: US 7,023,374 B2
(45) Date of Patent: Apr. 4, 2006

(54) METHOD AND APPARATUS FOR SIGNAL DETECTION AND JAMMING

(75) Inventors: Abraham Jossef, 9 David Dvora, 55502 Kiryat Ono (IL); Ron Yaacov Davidson, 5 Habroshim Street, 30900 Zichron Yaacov (IL); Raviv Levin, Ashkelon (IL); Itay Hect, TifEret Ramot (IL)

(73) Assignees: Abraham Jossef, Kiryat Ono (IL); Ron Yaacov Davidson, Zichron Yaacov (IL)

( * ) Notice: Subject to any disclaimer, the term of this patent is extended or adjusted under 35 U.S.C. 154(b) by 327 days.

(21) Appl. No.: 10/491,450

(22) PCT Filed: Oct. 6, 2002

(86) PCT No.: PCT/IL02/00809

§ 371 (c)(1),
(2), (4) Date: Apr. 15, 2004

(87) PCT Pub. No.: WO03/034087

PCT Pub. Date: Apr. 24, 2003

(65) Prior Publication Data

US 2004/0263378 A1 Dec. 30, 2004

Related U.S. Application Data

(60) Provisional application No. 60/329,788, filed on Oct. 16, 2001.

(51) Int. Cl.
*G01S 7/40* (2006.01)

(52) U.S. Cl. .................. 342/20; 342/15; 342/194; 342/195; 455/226.1

(58) Field of Classification Search ............. 342/13–15, 342/20, 83, 175, 194, 195, 198; 455/226.1, 455/227, 228, 229
See application file for complete search history.

(56) References Cited

U.S. PATENT DOCUMENTS

| | | | | | |
|---|---|---|---|---|---|
| 4,584,710 A | * | 4/1986 | Hansen | ..................... | 455/226.1 |
| 4,597,107 A | * | 6/1986 | Ready et al. | ............ | 455/226.1 |
| 4,837,578 A | * | 6/1989 | Gammell | ..................... | 342/194 |
| 5,230,097 A | * | 7/1993 | Currie et al. | ............ | 455/226.1 |
| 5,440,228 A | * | 8/1995 | Schmidt | .................. | 324/76.12 |
| 6,069,580 A | * | 5/2000 | Martinson | .................... | 342/20 |

OTHER PUBLICATIONS

"A planar microwave frequency discriminator", Rutkowski, A.; Stec, B.; Microwaves and Radar, 1998. MIKON '98., 12th International Conference on, vol.: 2, May 20–22, 1998 pp.: 368–372.*

"Analysis and experimental results of digital quadrature coherent detector", Sun Xiaobing; Bao Zhenng;Radar, 1996. Proceedings, CIE International Conference of Oct. 8–10, 1996 Ps.381–384.*

"A high–speed direct frequency synthesizer", Saul, P.H.; Taylor, D.G.;Solid–State Circuits, IEEE Journal of, vol.: 25, Issue: 1 , Feb. 1990 pp.: 215–219.*

"Analysis of quadrature detectors using complex envelope notation", Roome, S.J.;Radar and Signal Processing [see also IEE Proceedings–Radar, Sonar and Navigation], IEE Proceedings F, vol.: 136 , Issue: 2 , Apr. 1989 Ps:95–100.*

* cited by examiner

*Primary Examiner*—John B. Sotomayor
(74) *Attorney, Agent, or Firm*—G.E. Ehrlich (1995) Ltd.

(57) ABSTRACT

Apparatus and method for multi-band, multi-frequency signal detection and transmission, comprising a multi-band wideband antenna, a receiver based on a plurality of synthesized down-converters and a plurality of synthesized programmable multi-channel phase-locked LOs, a DDS and a synthesized complex I/Q phase-detector, a control center based on a DSP connected with an ADC, plurality of DACs and an FPGA, and a plurality of synthesized programmable multi-channel transmitters synchronized with the DDS.

32 Claims, 27 Drawing Sheets

METHOD AND APPARATUS FOR SIGNAL DETECTION AND JAMMING

CROSS-REFERENCE TO RELATED PATENT APPLICATIONS

This application is a National Phase Application of PCT/IL02/00809 International Filing Date Oct. 6, 2002, which claims priority from and is related to U.S. Provisional Patent Application Ser. No. 60/329,788 filed Oct. 16, 2001, this U.S. Provisional Patent Application incorporated by reference in its entirety herein.

FIELD OF THE INVENTION

The present invention relates generally to the field of receivers and transmitters and more particularly to radar detecting and jamming.

BACKGROUND OF THE INVENTION

U.S. Pat. No. 4,961,074 to Martinson discloses radar detectors, which are capable of monitoring at least two frequency bands. A broadband antenna is provided, together with a mixer comprising an anti-parallel pair of diodes, and at least one local oscillator. The local oscillator frequency is mixed with radar frequency from the antenna to produce an intermediate signal which is amplified, further down converted, detected and fed to signal processing circuitry to actuate an alarm when radar frequency of interest is detected. The disclosed detector uses one mixer in the first stage to cover all bands, comprises no pre-amplifiers and no synthesized LOs.

U.S. Pat. No. 4,952,936 to Martinson discloses radar detection devices sensitive to signals from various different frequency bands. A broadband antenna is provided, together with a mixer and a plurality of local oscillators. Signals from the local oscillators are mixed one at a time with signals from the antenna, there being one local oscillator signal for each radar frequency or pair of frequencies of interest, which may be received by the antenna. Each local oscillator signal is chosen so that when it is mixed with the respective radar frequency signal, an intermediate signal is produced, which is the same for all mixtures. This intermediate signal is further down converted and fed to signal processing circuitry to produce an alarm when radar frequencies of interest are detected. The disclosed detector uses the same antenna, pre-amplifier and mixer to cover all bands.

U.S. Pat. No. 4,630,054 to Martinson discloses radar detection and signal processing circuits. Following a front end having an RF and local oscillator mixer to an I.F., the signal is then further mixed against a signal from a swept frequency oscillator, in the presence of a microwave frequency signal. The output of a band pass filter goes to a detector for frequency modulated intermediate frequency signals, and that detector has at least a first output signal that is fed to two pairs of complementary paired comparators, the outputs of which are set to low and high threshold levels. The sensitivity of the circuit may adjust up or down according to the number of low threshold signals that are detected; or dynamically if too many low threshold signals are detected in a small group of time cells. The disclosed detector detects and stores signals only at the amplitude level. An alert for out-of-band signals is given if they exist for a predetermined time. No pre-amplifier is used at the front-end.

U.S. Pat. Nos. 4,750,215 and 4,862,175 to Biggs et al disclose a radar-warning receiver having a police radar signal detection circuit which generates evaluation signals, the state of which indicates the voltage level relative a threshold voltage of a discriminator output, as the local oscillator is swept through the radar band. The times during which the evaluation signals are in one state or the other are utilized to identify whether the received signal is from a fixed frequency source or a variable frequency source. The disclosed detector detects signals only at the amplitude level. No pre-amplifier is used at the front-end.

U.S. Pat. Nos. 4,954,828 and 5,079,553 to Orr disclose a police radar warning receiver including a DSP circuit having a correlator and a peak detector to provide after each sweep of a swept local oscillator a dynamic threshold for that sweep as affected by all prior sweeps and against which information from that sweep is evaluated to determine whether to generate an alarm enable indicative of receipt of a police radar signal. The disclosed detector detects signals only at the amplitude level.

U.S. Pat. Nos. 5,300,932 and 5,250,951 to Valentine, et al. disclose a police radar signal detector which detects and monitors radar signals from up to nine radar sources until a detected radar signal has not been redetected for a given number of detector operations, or spectrum sweeps, or until a detected signal has been displaced by a higher priority radar signal. In the police radar signal detector disclosed, a user of the detector is advised not only of the presence of detected radar signals, the frequency band of detected radar signals and the relative field strength of the signals but also of the number of different radar signal sources which are transmitting signals toward the user's motor vehicle. In addition, the directions of radar sources are determined. The determination of which antenna has received the signal is based on detecting difference of amplitude between back and front antennae. The disclosed detector detects signals only at the amplitude level.

U.S. Pat. No. 5,305,007 to Orr et al. discloses a wideband radar detection apparatus including a signal detection section, a high rate signal processing section and a low rate signal processing section. The signal detection section sweeps through a range of pre-selected frequencies and generates an output signal having a pair of single cycle sinusoids for every detected signal. The output signal is provided to the high rate signal processing section and a Sliding Window DFT is performed thereon to generate a set of complex values that are related to the fundamental energy content at consecutive points in the sweep. The low rate signal processing section controls sweep parameters and also evaluates the complex values. If the magnitude of the complex values exceeds a predefined threshold, then an alert is indicated. The disclosed detector detects only the magnitude of the detected signals, has no pre-amplifiers and no synthesized LOs.

U.S. Pat. No. 6,175,324 to Valentine, et al. discloses a frequency scheme for a police radar detector, which enables sweeping of the X, K, Ku and Ka radar bands. The frequency scheme requires two initial frequency conversions for detection of the X, K and Ka radar bands and a single initial frequency conversion for the Ku radar band with single initial frequency conversion being enabled by disabling the second mixer. During sweeping of the X, K and Ka bands, selectable sideband suppression is employed to reduce undesired image sidebands and noise prior to the second frequency conversion. In addition, noise at the second IF frequency is reduced to prevent this noise from feeding through the second mixer into the second IF amplifier. During the Ku band sweep, the second mixer is bypassed and shunting of signals at the second IF frequency is disabled so that these signals enter the second IF amplifier. The disclosed detector uses a single wideband stage for all bands.

U.S. Pat. No. 5,900,832 to Valentine, et al. discloses an input stage for a police radar detector including a single mixer together with at least one preamplifier to detect radar signals in the X, K and Ka bands. Some or all of the receiver responses are swept independently with the preamplifier or preamplifiers being enabled one at a time as appropriate for each band being scanned. The Ka band signals are coupled to a single mixer through a preamplifier, which permits multiple responses to be swept in the Ka band, or passively, to receive dual responses in the Ka band. The disclosed detector uses multiple pre-amplifiers for one mixer, thus being able to sweep only one band at a time.

U.S. Pat. No. 5,068,663 to Valentine, et al. discloses a radar detector for use in a motor vehicle employing amplitude detection. Amplitude signals are generated by down-converting received signals using a series of mixers, one of which is swept to insure signal detection, and compared to a threshold which is controlled such that noise is detected by the comparison on average a selected period of time. After passing a first test of persistence, the signals are verified by means of frequency modulating the first of the series of mixers, detecting the frequency modulation and correlating the detected frequency modulation to determine whether the signal is valid and if so, to which radar frequency band the signal belongs. The disclosed detector provides only amplitude detection of a signal. Out-of-band signals may be detected, if they exist for a sufficient time, due to wideband detection.

Due to the high density of communication signals, satellite, radar systems etc., that cause high false alarm rate when using wideband detectors, there is need for a signal detection device with higher sensitivity, to enable improved in-band signal detection, while suppressing out of band signals.

SUMMARY OF THE INVENTION

The system of the present invention endeavors to overcome the shortcomings of the prior-art, by providing a signal detector and transmitter with improved in-band sensitivity. This aim is achieved, amongst others, by:

Using a dedicated antenna, pre-amplifiers, mixer and band-pass filter for each band, to limit the bandwidth, thus giving better sensitivity for each band. This is advantageous for out-of-band signal suppression and for better identification using hardware and software control to attain a limited bandwidth use of dedicated front-end stage (+down-converter) for each band, to enable better suppression of out-of-band signals use of synthesized and DDS-synchronized LOs use of an I/Q phase detector, to enables detection of both phase and amplitude of the signal, for high resolution tracking and locking on the signal and for better signal-to-noise ratio.

In one aspect of the present invention, there is provided an apparatus for multi band, multi-frequency signal detection and transmission, comprising:

a multi-band wideband antenna for receiving said signals;
a receiver, connected with said antenna, said receiver comprising:
    a plurality of low-noise amplifiers (LNAs);
    a DDS driven by a reference source;
    a plurality of synthesized down-converters, each of said plurality of down-converters connected with a respective one of said LNAs;
    a plurality of synthesized programmable multi-channel phase-locked LOs based on said DDS, wherein each of said plurality of down-converters is connected with a respective one of said synthesized programmable multi-channel LOs and wherein each of said LOs is synchronized with said DDS; and
    a synthesized complex I/Q phase-detector comprising an LO, said phase-detector synthesized LO based on said DDS, said phase-detector connected with said down-converters;
a control center comprising:
    a powerful DSP;
    a memory unit connected with said DSP;
    analog-to-digital converter (ADC) connected with said I/Q phase detector and with said DSP;
    a plurality of digital-to-analog converters (DACs) connected with said DSP; and
    FPGA connected with said DSP and with said plurality of programmable synthesized receiver LOs, said FPGA additionally connected with said DDS for programming controls; and
a multi-band transmitter comprising:
    a plurality of synthesized programmable multi-channel transmitters based on said DDS, each of said transmitters synchronized with said DDS and each of said transmitters connected with said FPGA for receiving programming controls; and
    a plurality of multi-band wide-band antennae for transmitting.

In one embodiment of this aspect, the DSP is operable to execute a jamming program.

In another embodiment of this aspect, the apparatus is a radar detector and jammer.

In yet another embodiment of this aspect, the apparatus is a police radar detector and jammer, which may be mounted on a vehicle and may include an arrangement for inserting a spirit level.

In another embodiment of this aspect, the DDS resides in the transmitter unit.

In another embodiment of this aspect, the antennae for receiving are patch/planar antennae.

In yet another embodiment of this aspect, the antennae for transmitting are patch/planar antennae.

In yet another embodiment of this aspect, the apparatus additionally comprises GPS device.

In yet another embodiment of this aspect, the apparatus additionally comprises user-interface devices connected with the DSP, the user-interface devices selected from a group consisting of a keyboard, a display and a PDA.

In yet another embodiment of this aspect, the apparatus additionally comprises a detachable memory unit. The detachable memory unit may be a non-volatile memory or a flash card.

In yet another embodiment of this aspect, the receiver unit comprises three modes of operation for detecting a signal: coarse search, fine search and acquisition.

In yet another embodiment of this aspect, the coarse search comprises wideband high dynamic-range detection at 100 MHz bandwidth with −82 dBm sensitivity.

In yet another embodiment of this aspect, the coarse search may be conducted simultaneously for all required bands.

In yet another embodiment of this aspect, the coarse search additionally comprises monitoring RDD activity.

In yet another embodiment of this aspect, the fine search comprises detection at 10 MHz bandwidth with −98 dBm sensitivity.

In yet another embodiment of this aspect, the acquisition comprises detection at 2.5 KHz bandwidth.

In yet another embodiment of this aspect, the receiver unit additionally comprises digitally adaptive references used by the three modes of operation to enhance detection accuracy.

In yet another embodiment of this aspect, the antenna for receiving comprises a plurality of antennae. The antennae may be patch/planar antennae.

In yet another embodiment of this aspect, the antennae for transmitting are patch/planar antennae.

In a second aspect of the present invention, there is provided an apparatus for multi-band, multi-frequency signal detection and transmission, comprising:
- a multi-band wideband antenna for receiving said signals;
- a receiver, connected with said antenna, said receiver comprising:
  - a plurality of low-noise amplifiers (LNAs);
  - a DDS driven by a reference source;
  - a plurality of synthesized down-converters, each of said plurality of down-converters connected with a respective one of said LNAs;
  - a plurality of synthesized programmable multi-channel phase-locked LOs based on said DDS, wherein each of said plurality of down-converters is connected with a respective one of said synthesized programmable multi-channel LOs and wherein each of said LOs is synchronized with said DDS; and
  - a synthesized complex I/Q phase-detector comprising a synthesized LO, said phase-detector synthesized LO based on said DDS, said phase-detector connected with said down-converters;
- a control center comprising:
  - a powerful DSP;
  - a memory unit connected with said DSP;
  - analog-to-digital converter (ADC) connected with said I/Q phase detector and with said DSP;
  - a plurality of digital-to-analog converters (DACs) connected with said DSP; and
  - FPGA connected with said DSP and with said plurality of programmable synthesized receiver LOs, said FPGA additionally connected with said DDS for programming controls; and
- a multi-band transmitter comprising:
  - a plurality of multi-channel free-run VCOs, each of said VCOs connected with a respective one of said DACs for voltage tuning; and
  - a plurality of multi-band wide-band antennae for transmitting.

In one embodiment of this aspect, the DSP is operable to execute a jamming program.

In another embodiment of this aspect, the apparatus is a radar detector and jammer.

In yet another embodiment of this aspect, the apparatus is a police radar detector and jammer, which may be mounted on a vehicle and may include an arrangement for inserting a spirit level.

In a further embodiment of this aspect, the free-run VCOs are synchronized with the receiver LOs in a calibration process using the DSP.

In a further embodiment of this aspect, the free-run VCOs are based on FET.

In another embodiment of this aspect, the DDS resides in the transmitter unit.

In another embodiment of this aspect, the antennae for receiving are patch/planar antennae.

In yet another embodiment of this aspect, the antennae for transmitting are patch/planar antennae.

In yet another embodiment of this aspect, the apparatus additionally comprises GPS device.

In yet another embodiment of this aspect, the apparatus additionally comprises user-interface devices connected with the DSP, the user-interface devices selected from a group consisting of a keyboard, a display and a PDA.

In yet another embodiment of this aspect, the apparatus additionally comprises a detachable memory unit. The detachable memory unit may be a non-volatile memory or a flash card.

In yet another embodiment of this aspect, the receiver unit comprises three modes of operation for detecting a signal: coarse search, fine search and acquisition.

In yet another embodiment of this aspect, the coarse search comprises wideband high dynamic-range detection at 100 MHz bandwidth with −82 dBm sensitivity.

In yet another embodiment of this aspect, the coarse search may be conducted simultaneously for all required bands.

In yet another embodiment of this aspect, the coarse search additionally comprises monitoring RDD activity.

In yet another embodiment of this aspect, the fine search comprises detection at 10 MHz bandwidth with −98 dBm sensitivity.

In yet another embodiment of this aspect, the acquisition comprises detection at 2.5 KHz bandwidth.

In yet another embodiment of this aspect, the receiver unit additionally comprises digitally adaptive references used by the three modes of operation to enhance detection accuracy.

In yet another embodiment of this aspect, the antenna for receiving comprises a plurality of antennae. The antennae may be patch/planar antennae. In yet another embodiment of this aspect, the antennae for transmitting are patch/planar antennae.

In a third aspect of the present invention there is provided an apparatus for multi-band, multi-frequency signal detection, comprising:
- a multi-band wideband antenna for receiving said signals;
- a receiver, connected with said antenna, said receiver comprising:
  - a plurality of low-noise amplifiers (LNAs);
  - a DDS driven by a reference source;
  - a plurality of synthesized down-converters, each of said plurality of down-converters connected with a respective one of said LNAs;
  - a plurality of synthesized programmable multi-channel phase-locked LOs based on said DDS, wherein each of said plurality of down-converters is connected with a respective one of said synthesized programmable multi-channel LOs and wherein each of said LOs is synchronized with said DDS; and
  - a synthesized complex I/Q phase-detector comprising an LO, said phase-detector LO based on said DDS, said phase-detector connected with said down-converters;
- a control center comprising:
  - a powerful DSP;
  - a memory unit connected with said DSP;
  - analog-to-digital converter (ADC) connected with said I/Q phase detector and with said DSP;
  - a plurality of digital-to-analog converters (DACs) connected with said DSP; and
  - FPGA connected with said DSP and with said plurality of programmable receiver LOs, said FPGA additionally connected with said DDS for programming controls.

In one embodiment of this aspect, the antennae for receiving are patch/planar antennae In another embodiment of this aspect, the apparatus additionally comprises GPS device.

In yet another embodiment of this aspect, the apparatus additionally comprises user-interface devices connected with the DSP, the user-interface devices selected from a group consisting of a keyboard, a display and a PDA.

In yet another embodiment of this aspect, the apparatus additionally comprises a detachable memory unit. The detachable memory unit may be a non-volatile memory or a flash card.

In yet another embodiment of this aspect, the receiver unit comprises three modes of operation for detecting a signal: coarse search, fine search and acquisition.

In yet another embodiment of this aspect, the coarse search comprises wideband high dynamic-range detection at 100 MHz bandwidth with −82 dBm sensitivity.

In yet another embodiment of this aspect, the coarse search may be conducted simultaneously for all required bands.

In yet another embodiment of this aspect, the coarse search additionally comprises monitoring RDD activity.

In yet another embodiment of this aspect, the fine search comprises detection at 10 MHz bandwidth with −98 dBm sensitivity.

In yet another embodiment of this aspect, the acquisition comprises detection at 2.5 KHz bandwidth.

In yet another embodiment of this aspect, the receiver unit additionally comprises digitally adaptive references used by the three modes of operation to enhance detection accuracy.

In yet another embodiment of this aspect, the antenna for receiving comprises a plurality of antennae. The antennae may be patch/planar antennae.

In a fourth aspect of the present invention there is provided an apparatus for multi-band, multi-frequency signal transmission, comprising:
  a control center comprising:
    a powerful DSP;
    a memory unit connected with said DSP;
    FPGA connected with said DSP;
    a DDS driven by a reference source and connected with said FPGA for programming controls; and
  a multi-band transmitter comprising:
    a plurality of synthesized programmable multi-channel transmitters based on said DDS, each of said transmitters synchronized with said DDS and each of said transmitters connected with said FPGA for receiving programming controls; and
    a plurality of multi-band wide-band antennae for transmitting.

In one embodiment of this aspect, the DSP is operable to execute a jamming program.

In another embodiment of this aspect, the apparatus is a radar detector and jammer.

In yet another embodiment of this aspect, the apparatus is a police radar detector and jammer, which may be mounted on a vehicle and may include an arrangement for inserting a spirit level.

In another embodiment of this aspect, the antennae for receiving are patch/planar antennae.

In yet another embodiment of this aspect, the apparatus additionally comprises GPS device.

In yet another embodiment of this aspect, the apparatus additionally comprises user-interface devices connected with the DSP, the user-interface devices selected from a group consisting of a keyboard, a display and a PDA.

In yet another embodiment of this aspect, the apparatus additionally comprises a detachable memory unit. The detachable memory unit may be a non-volatile memory or a flash card.

In yet another embodiment of this aspect, the antennae for transmitting are patch/planar antennae.

According to a fifth aspect of the present invention there is provided a method of detecting multi-band multi-channel signals, said method comprising the steps of:
  receiving a signal;
  down-converting said received signal to a base-band signal, wherein said base-band signal comprises a complex I and Q vector;
  converting said I and Q from analog to digital;
  processing said digital signal using FFT to locate the signal in the filtered frequency domain, said step of processing comprising the steps of:
  dividing said base-band bandwidth into F frequency sub-domains;
  repeating said step of dividing for each relevant one of said sub-domains R times; and
  following each of said dividing steps, storing information with respect to said digital signal signature.

According to one embodiment of this aspect the method additionally comprises the step of using said stored signature for determining whether said signal is a signals of interest.

According to another embodiment of this aspect the signals of interest are radar signals.

According to another embodiment of this aspect the signals of interest are police-radar signals.

According to another embodiment of this aspect F is 16.

According to another embodiment of this aspect R is 3.

According to another embodiment of this aspect the signals of interest are determined regionally.

According to another embodiment of this aspect the digital signal signature comprises: frequency, amplitude, frequency rate change, complex I/Q vector direction, last update time and lock quality.

According to a sixth aspect of the present invention there is provided a method of detecting and transmitting multi-band multi-channel signals of interest, comprising the steps of:
  receiving a signal;
  down-converting said received signal to a base-band signal, wherein said base-band signal comprises a complex I and Q vector;
  converting said I and Q from analog to digital;
  processing said digital signal using FFT to locate the signal in the filtered frequency domain, said step of processing comprising the steps of:
  dividing said base-band bandwidth into F frequency sub-domains;
  repeating said step of dividing for each relevant one of said sub-domains R times; and
  following each of said dividing steps, storing information with respect to said digital signal signature;
  using said stored signature for determining whether said signal is one of said signals of interest; and
  transmitting a signal, based on said stored signature of said detected signal of interest.

According to one embodiment of this aspect the signals of interest are radar signals.

According to another embodiment of this aspect the signals of interest are police-radar signals.

According to another embodiment of this aspect F is 16.

According to another embodiment of this aspect R is 3.

According to another embodiment of this aspect the signals of interest are determined regionally.

According to another embodiment of this aspect the digital signal signature comprises: frequency, amplitude, frequency rate change, complex I/Q vector direction, last update time and lock quality.

According to another embodiment of this aspect the step of transmitting comprises the steps of:

setting a maximum speed for jamming; and selecting a jamming mode.

According to another embodiment of this aspect the jamming mode comprises at least one of the group comprising: random, constant, FM modulation, fraction and descending.

According to another embodiment of this aspect the random mode comprises transmitting a random frequency not higher than said maximum speed frequency.

According to another embodiment of this aspect the constant mode comprises transmitting a constant frequency not higher than said maximum speed frequency.

According to another embodiment of this aspect the FM modulation mode comprises transmitting a linearly modulated frequency not higher than said maximum speed frequency.

According to another embodiment of this aspect the FM modulation mode comprises transmitting a non-linearly modulated frequency not higher than said maximum speed frequency.

According to another embodiment of this aspect the fraction mode comprises transmitting a fraction of the real speed frequency.

According to another embodiment of this aspect the descending mode comprises transmitting a descending frequency, said descending frequency starting at said maximum speed frequency.

According to another embodiment of this aspect the descending mode additionally comprises alternately transmitting an ascending frequency.

According to another embodiment of this aspect each of said jamming modes comprises frequency hopping.

BRIEF DESCRIPTION OF THE DRAWINGS

For a better understanding of the invention, its operating advantages and the specific objects attained by its uses, reference should be made to the accompanying drawings, in which.

DETAILED DESCRIPTION OF THE INVENTION

Figure 1:
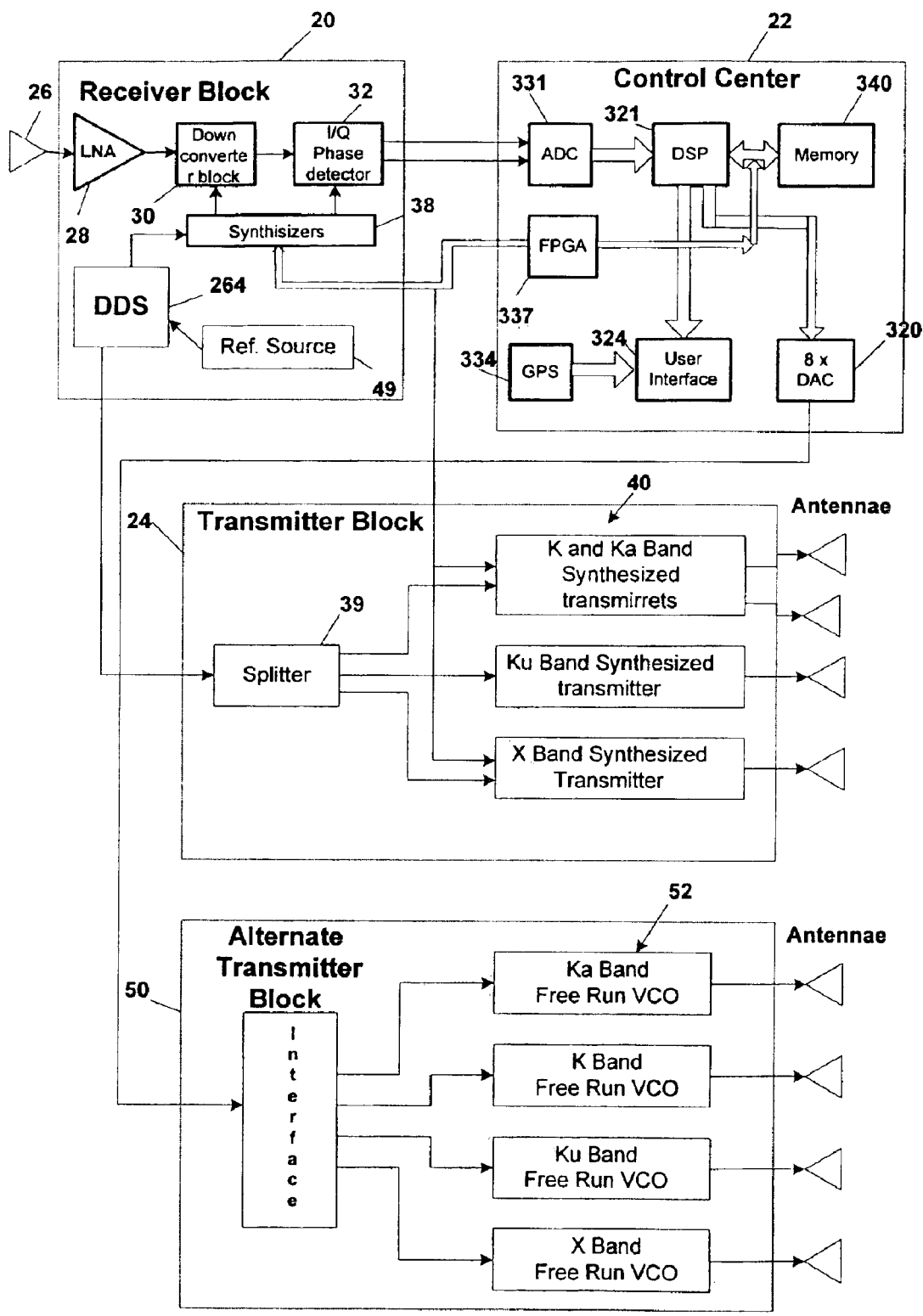
FIG. 1 is a schematic general block diagram of the system of the present invention.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The system of the present invention is a multi-band multi-frequency signal detector and transmitter. In a preferred embodiment of the present invention, the system is a multi-band multi-frequency signal detector and jammer. The system may also be used as a stand-alone transmitter. The system may be packaged in different sizes for different applications, e.g. hand-held, vehicle-mounted, etc. The system is hereinbelow described, in conjunction with a non-limiting radar detecting application example.

FIG. 1 is a schematic general block diagram of the system of the present invention. The main blocks are:

Receiver unit 20

Control center 22

Synthesized transmitter unit 24.

The receiver unit 20 comprises multi-band antennae 26, each connected to a wideband LNA 28, such as HMC263LM1, HMC261LM1 available from Hittite microwave corporation, Massachusetts, USA. Each LNA 28 is connected to a synthesized down-converter 30. The combined outputs of the down-converters are routed into an I/Q phase detector 32, which feeds the analog signal into the control center 22.

The receiver unit 20 additionally comprises a Direct Digital Synthesizer (DDS) 264, such as AD9850, available from Analog Device of Norwood Mass., USA, having a reference source 49. The DDS 264 synchronizes all the receiver-unit synthesizers 38, and each synthesized transmitter 40 to have a highly stable frequency, thus enabling the system to be fully synchronized with no need for calibration. The DDS 264 may alternatively be part of the transmitter unit 24.

The control center 22 comprises an Analog to Digital Converter (ADC) 331, such as AD9288, available from Analog Device of Norwood Mass., USA, which receives the signal from the receiver 20 and converts it into a digital signal. The ADC 331 is connected to a high-speed high-capability DSP 321, such as TMS320C6713 available from Texas Instruments Inc., of Dallas, Tex., USA. The DSP 321 processes the incoming signal and identifies its characteristics, to enable locking on the exact frequency and transmitting the locked frequency plus Doppler. The DSP 321 controls receiver synthesizers 38 and transmitter synthesizers 40 using an FPGA component 337, such as EPF10K10ATC144 available from Altera Corp., of San Jose, Calif., USA, to execute the commands. The DSP 321 additionally controls user interface devices 324, GPS 334 and 8 digital-to-analog (DAC) converters 320, such as TLV5630, also available from Texas Instruments Inc., which serve for frequency scanning of the free run VCOs 52. Memory unit 340 stores the executable software of the control center 22.

The transmitter unit 24 comprises a splitter 39 and synthesizers 40.

In an alternative multi-band transmitter-unit 50, free-run VCOs 52, such as NE33200 and NE27200 (based on FET), available from NEC Corp., of Tokyo, Japan, have the capability of transmitting multi-channel frequencies. The free-run VCOs 52 need to be calibrated with the receiver LOs 38, using the DSP 321 of the control center 22.

The system's radio includes a multi-band multi-frequency receiver, used as a threat detector/tracker and a multi-band multi-frequency transmitter used as a programmed jammer.

Figure 2A:
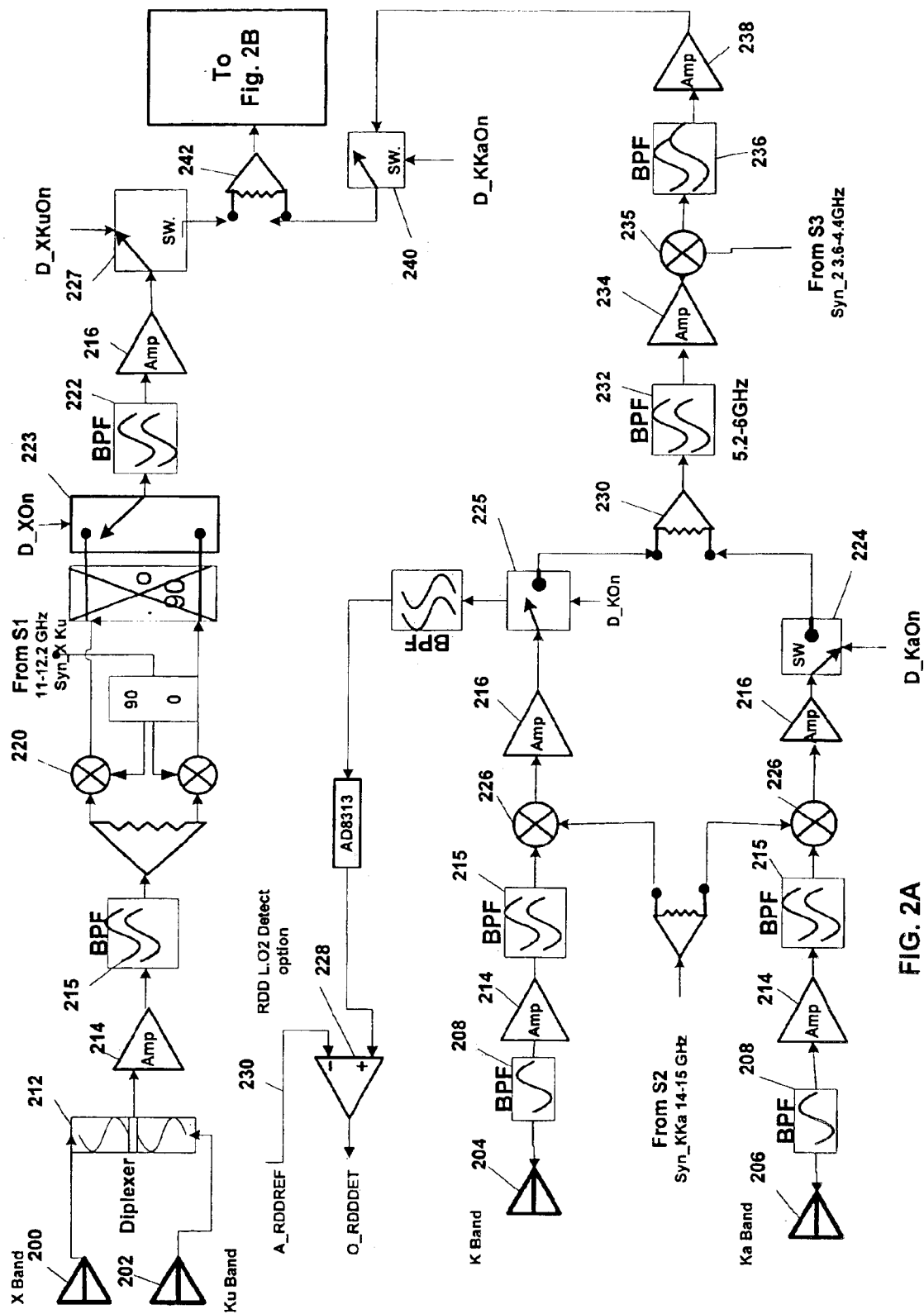
FIGS. 2A and 2B are a schematic block diagram of the receiver according to a preferred embodiment of the present invention.
Figure 2B:
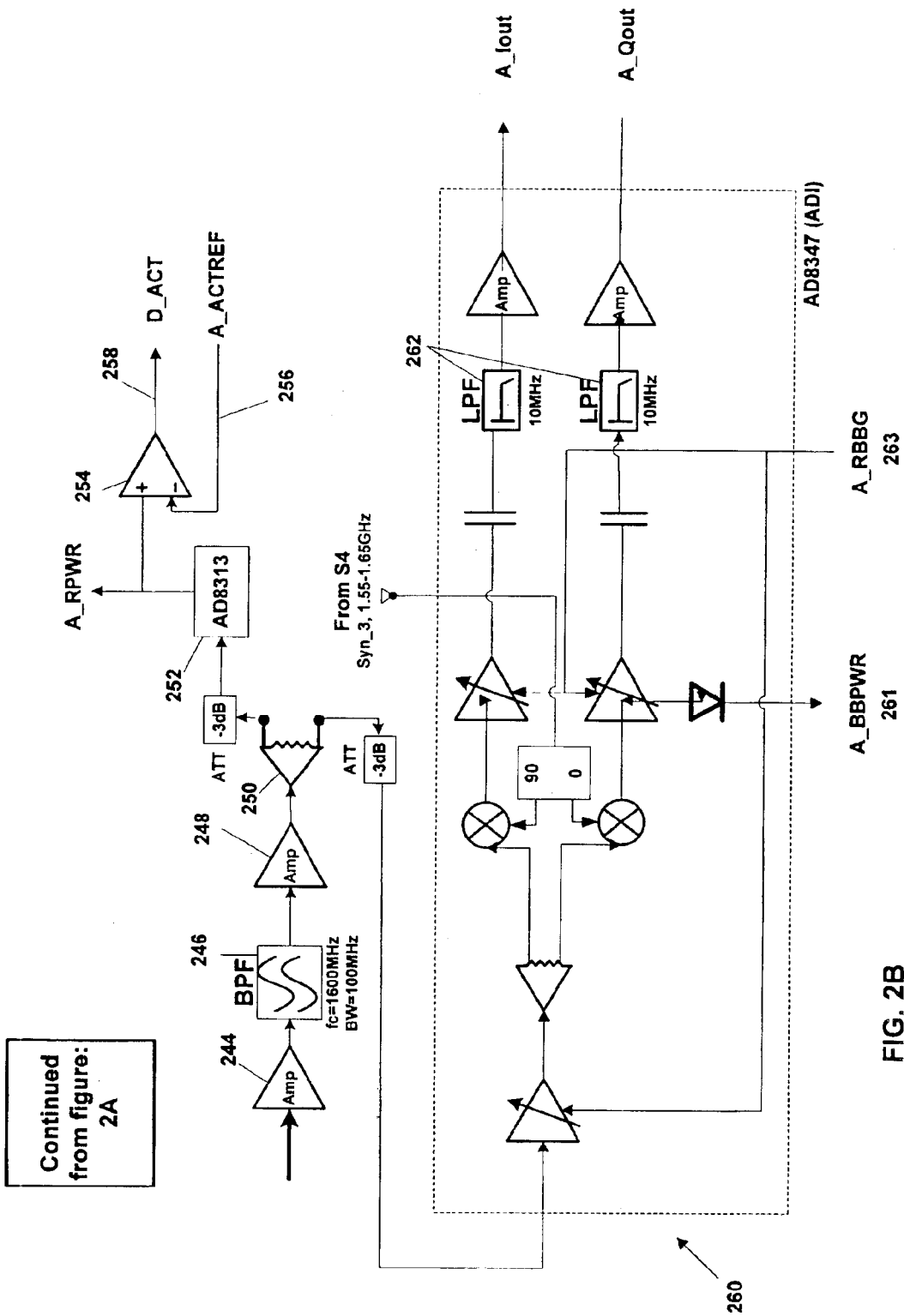
Figure 3:
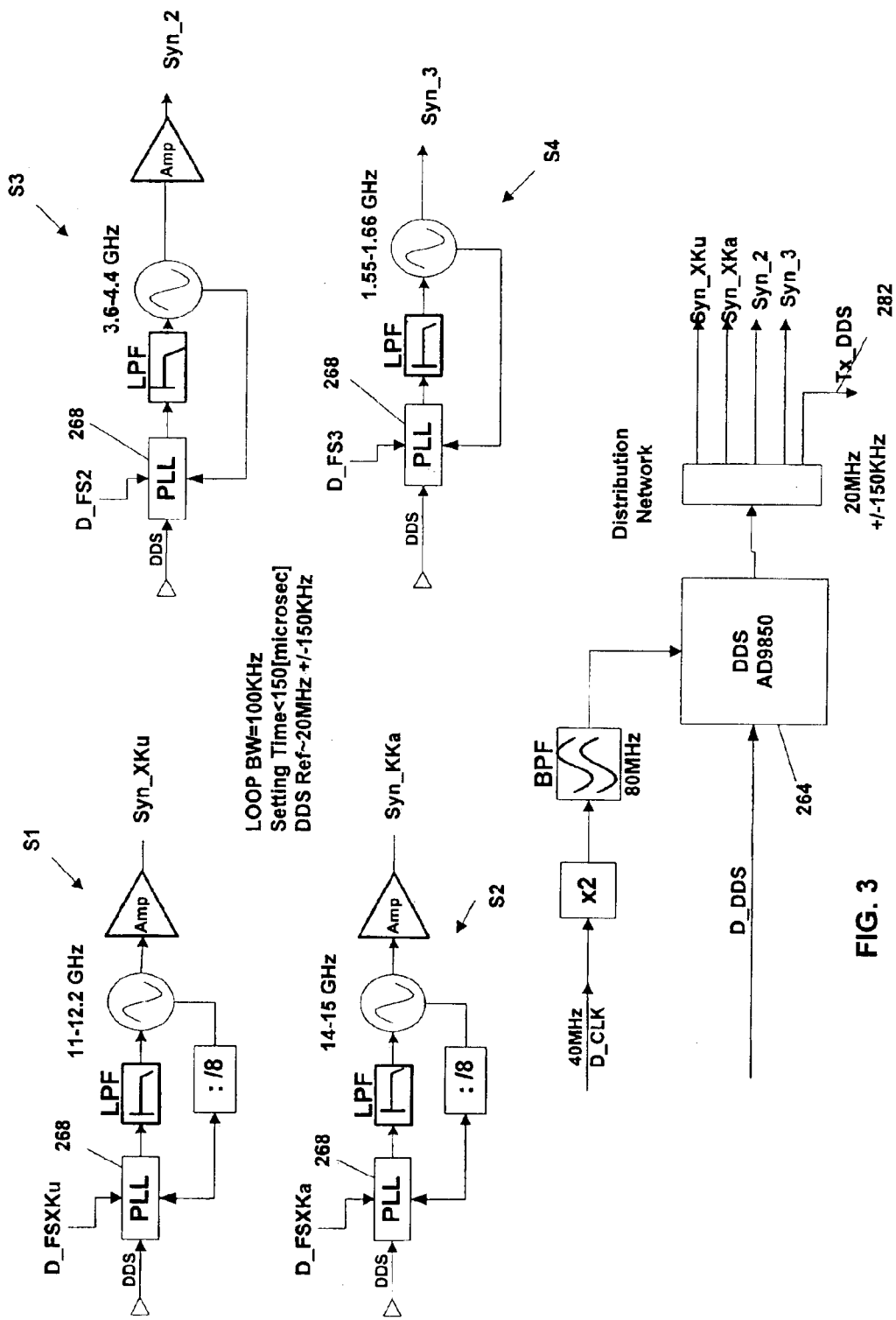
FIG. 3 is a schematic block diagram of the receiver synthesizers according to a preferred embodiment of the present invention.

FIGS. 2 and 3 are schematic block diagrams of the receiver, which provides full detection and locks on any radar operating within any band or frequency within the band (e.g. police radar that operates within the frequency bands of X, Ku, K and Ka). The receiver comprises four main blocks:

Antennae;
Front end;
Down converters (LO synthesizers, DDS and frequency reference); and
IF base-band down converters using I/Q demodulator.

Figure 4:
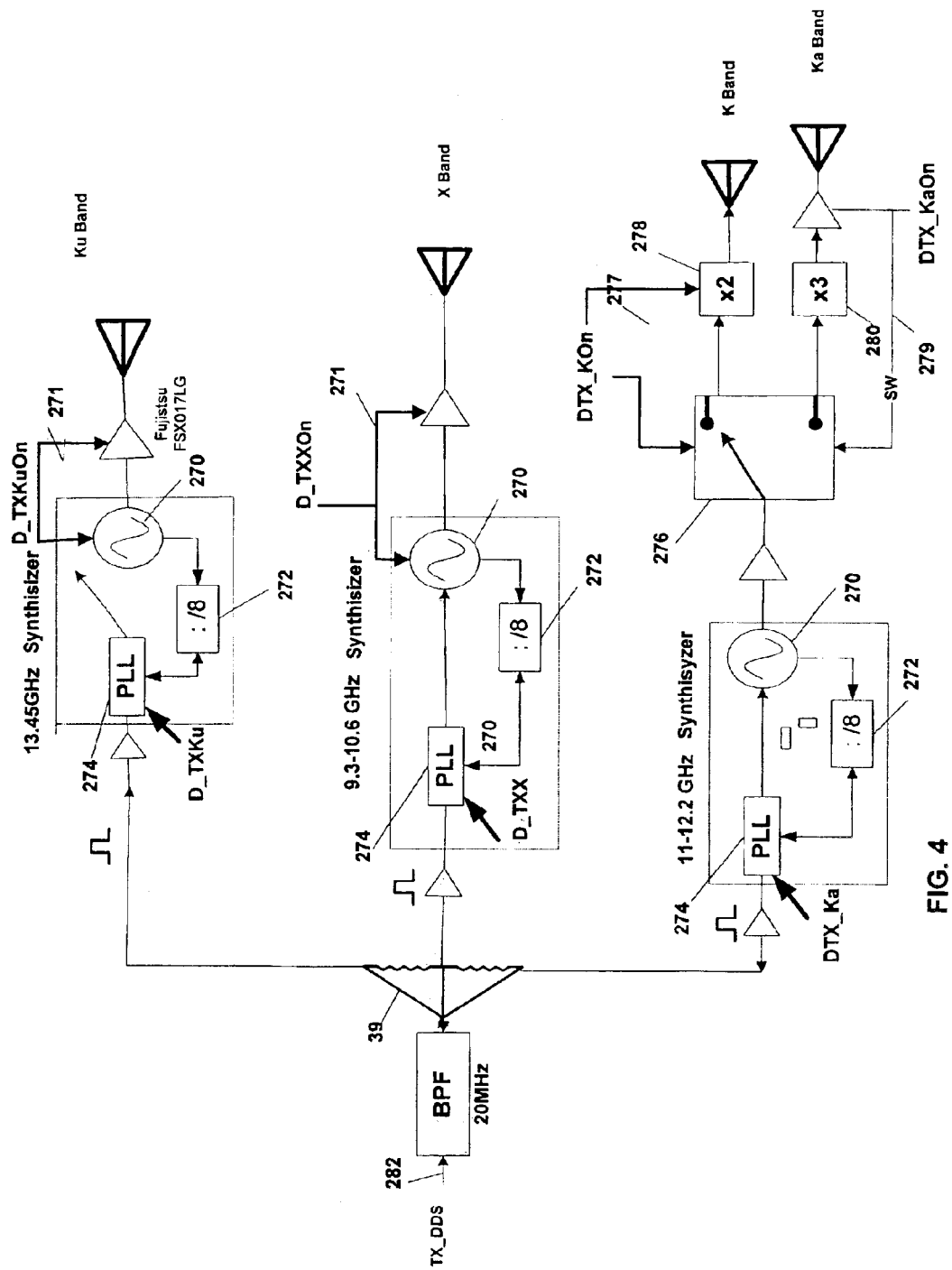
FIG. 4 is a schematic block diagram of the transmitter according to a preferred embodiment of the present invention.

FIG. 4 is a block diagram of the transmitter, designed to transmit a signal that covers each of the frequency bands detectable by the receiver. The transmitter may provides jamming techniques that protect the user from being detected by police radar. The transmitter is based on:

Programmable Phase Locked VCOs (DDS, synthesizers);
Transmit amplifiers; and
Antennae.

The receiver and the control center operate as a detector, calculate the signal signature and respond with the transmitter unit to any threat within the frequency bands (e.g. of X, Ku, K and Ka).

The receiver and the control center may be used as a stand-alone detector unit and have the ability to detect, lock and display the radar (e.g. police radar) frequency. Other, out of band signals detected, may be filtered out and not displayed. The control center uses a special software filtering function that ignores all the noise and spurious detected signals, whereas the receiver uses hardware band-pass filters to reject the same out of band signals.

The jamming function and technique to be used by the transmitter are determined by the control center, according to the detected threat. The control center is triggered by a pre-warning signal from the receiver unit before threat is fully acquired.

The system operates in four modes:

1. Coarse search—In this mode the receiver searches within a 100 MHz bandwidth. It has the ability to search simultaneously in all four bands, with reduced sensitivity of about 6 dB, or it may search separately in each band with full sensitivity. The system may concurrently monitor Radio Detector Detector (RDD) activity, except when occupying K channels for acquiring a threat. A wideband activity detector triggers the control center to pass to the next mode.
2. Fine search—In this mode the receiver searches within a 10 MHz bandwidth, to provide full sensitivity in the most probable frequencies. The search may be zone programmed, or used after activity detection by the preceding mode of operation.
3. Acquire—In this mode the DSP in the control center uses the receiver synthesizers (LOs) to reach as close as possible to the frequency of the detected signal.
4. Lock and track mode—In this mode the DSP locks to the signal, to produce a base-band frequency offset as required for the selected jamming method. The transmitter is then activated in the relevant band/frequency, while phase locked to the same frequency reference.

The main features of the radio are:

Fully synthesized receiver and transmitter with a resolution smaller than 100 Hz Multimode operation Fast frequency/band switching time, typically<100 usec Wideband high dynamic range detection at 100 MHz bandwidth with very high sensitivity Simultaneous detection option in all four bands RDD leakage detection All detection modes use digitally adaptive reference to maximize sensitivity and minimize false alarms Very high sensitivity from X to Ka band with 10 MHz bandwidth Automatic gain control with more than 65 dB Extremely low leakage from receiver to antenna to avoid detection Transmitter automatic fast shut-off, if not locked to the required jamming frequency Phase locked jammer eliminates calibration time to increase probability of detection, or Free running VCO for transmitter, calibrated and locked to the receiver LOs. Attention is drawn now to FIG. 2A. Four antennae are used to cover all bands; the first antenna 200 covers the X band (10.5 GHz, 9.9 GHz, 9.41 GHz); the second antenna 202 covers the Ku band (13.45 GHz); the third antenna 204 covers the K band (24.025 to 24.25 GHz) and the fourth antenna 206 covers the Ka band (33.2 to 36 GHz). The antenna is connected directly to the front-end PCB to reduce the insertion loss on the line and keep the noise figure as low as possible. The antenna may be based on Horn antenna, or on a patch/planar antenna to save space. The antenna unit is designed for minimum gain of 15 dB for all bands.

The receiver front-end (FIG. 2A) is divided into three main channels: X/Ku channel, K channel and Ka channel, each having a printed low-order low-loss band pass filter (BPF) 208, 212 at the input, to prevent in-band intermodulations due to strong out-of-band signals. The X/Ku channel has a diplexer BPF 212 to avoid summing loss of the two bands. All channels have at least two low noise amplifiers 214, with a total gain of 30 dB, followed by an extra BPF 215 to enable high out-of-band signals and image rejection.

The X/Ku channel uses a high performance image rejection mixer 220 with an output SPDT switch 223 to select either X or Ku band reception, thus allowing both full sensitivity mode and simultaneous reception mode at −3 dB sensitivity degradation. The mixer 220 down-converts the signal into an IF frequency of 1.6 GHz, which is directly filtered by BPF 222 and amplified by amplifier 216 using a high dynamic range stage. A high isolation non-reflective SPST 227 is used to block the channels when unused.

The K and Ka channels use a harmonically pumped high performance mixer 226 to down-convert the signal to the 5.2–6 GHz band, but also use the same first down conversion to convert RDD LO 26.2–26.9 GHz band to 1.45–1.8 GHz, to detect RDD (e.g. Spectre) activity. This detection uses a high dynamic range Successive Detection Logarithmic Amplifier (SDLA) 228 and provides a typical tangential sensitivity of less than −76 dBm. To increase probability of detection and decrease false alarms, the SDLA 228 uses an adaptive digital threshold 230. Each of the K and Ka channels uses a high isolation switch 225, 224 respectively to block the channels when unused. The isolation switch 225 of the K channel also selects between RDD LO detection mode and normal receiver mode. The K and Ka channels are summed (230), filtered (232) and amplified (234) and then down converted to the final IF frequency of 1.6 Ghz by mixer and synthesized LO S3. The summed K/Ka channel is then filtered (236), amplified using a high dynamic range amplifier 238 and switched again (240) when unused. Next the X/Ku and the K/Ka channels are combined (242) to a unified IF receiver.

FIG. 2B is a schematic block diagram of the unified IF receiver, based on a monolithic wide-band I/Q phase detector 260, to deliver wide gain control range of more than 65dB and accurate amplitude/phase detection, using a high performance I/Q demodulator. The incoming signal is first pre-amplified (244), filtered (246) and amplified again (248), before being divided (250) to the main activity detector 252. The main activity detection uses a high dynamic range SDLA 254 and provides a typical tangential sensitivity of less than −82 dBm over the IF bandwidth of 100 MHz. To increase probability of detection and decrease false alarms, it uses an adaptive digital threshold 256. When a signal passes the threshold, the wideband activity detector 252 triggers the interrupt controller of the Control Center via comparator 254 and signal D_ACT that is connected to the DSP GPIO.

Base-band LPFs 262 of 10 MHz define the overall receiver sensitivity, along with the digital signal processing gain, which enables a −98 dBm typical sensitivity.

FIG. 3 is a schematic block diagram of the receiver synthesizers S1 through S4.

In order to achieve:
a. Less than 100 Hz frequency resolution at Ka band;
b. Fast settling time to enable on-time detection in search mode;
c. 0.002 ppm of short time frequency stability; and
d. Avoid higher division ratios in synthesizers and/or unrealistic voltage resolutions when using VCXOs or VCOs, the system uses a high performance Direct Digital Synthesizer (DDS) 264 as the frequency reference to the synthesizers.

All the receiver synthesizers use phase-locked loop (PLL) VCOs 268 that drive the conversion mixers (220, 226, 235, 260) directly or through amplification.

FIG. 4 is a schematic block diagram of the transmitter, based on three phase-locked X to Ka band VCOs 270, using fractional N division 272 to allow high speed exact programming of the PLLs 274 to the required frequency. Each of the X and Ku bands has its own PLL 274, while the K and Ka bands use a common PLL 274. The output of the K/Ka bands PLL is switched (276), according to the required band, to a doubler 278 for the K band or a tripler 280 for the Ka band. All bands outputs are filtered by printed band-pass filters (not shown), to suppress undesired output spurious signals including harmonics. The transmitter is fed via a coaxial cable to deliver the 20 MHz reference 282 from the receiver DDS and deliver the DC voltage to the transmitter, and two RG-45 cables carrying four twisted pair balanced control lines, which include the band frequency setting data and send back to the control center the PLLs lock detect signal. The output of each band is switched via its oscillator/amplifiers bias with an automatic switch-on/shut-off mechanism (271, 277, 279) to avoid "junk" transmission. This mechanism allows each specific band transmission only when its PLL is fully locked to the required frequency.

In an alternative multi-band multi frequency transmitter-unit, free-run VCOs have the capability of transmitting multi-channel frequencies. The free-run VCOs need to be calibrated with the receiver LOs, using the DSP of the Control Center. The free-run VCOs may be based on FET or on GUNN VCO.

Figure 5:
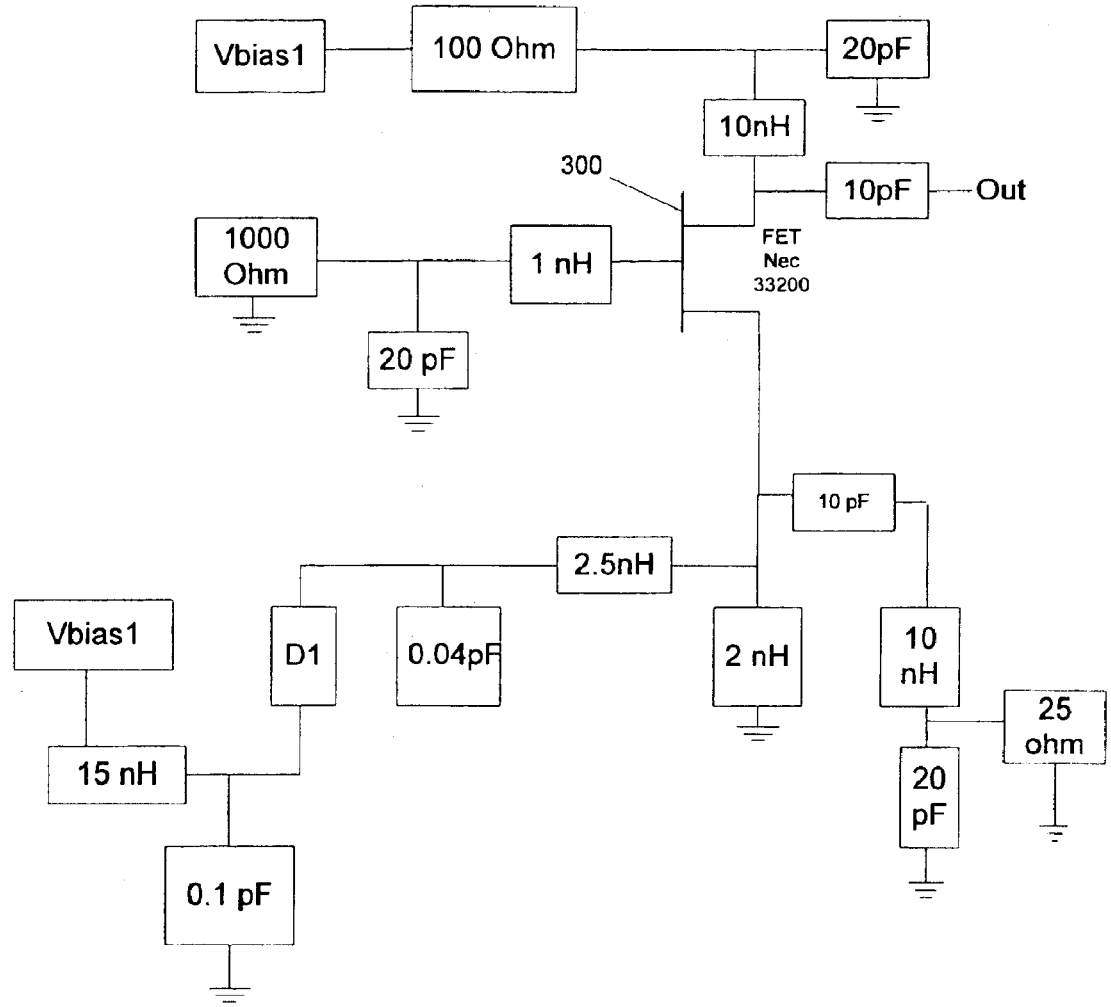
FIG. 5 is a schematic block diagram of the first transmitter according to another preferred embodiment of the present invention.

FIG. 5 is a schematic diagram of the X band VCO (9.34–10.61 GHz) circuit, comprising a single FET oscillator 300. The FET is biased by a single DC +5 Volt supplier 302. The circuitry of the FET includes DC elements, which provide DC bias and filtering, and RF elements, which provide the RF impedances required for oscillating. The circuit is assembled on a 15 mil. thick Alumina substrate by Chip & Wire technology. By terminating the right RF impedances to the Gate and the Source of the FET (inductive impedance to the Gate and capacitive impedance to the Source), the transistor 300 exhibits a negative resistance at the Drain port. A negative resistance is actually an active source. By selecting the right values for those impedances, the negative resistance at the Drain port is such that it oscillates and delivers RF power to a 50-OHM load at the desired frequency. The circuit that produces the capacitive impedance at the Source of the FET 300 contains a Varactor Diode, D1, which acts as a capacitor that changes its capacity due to the supply of a DC tuning voltage. A change in the capacity causes a change in the oscillating frequency of the circuit. By changing the tuning voltage from 3 to 7 Volts, the frequency changes from 9.34 to 10.61 GHz, respectively.

Figure 6:
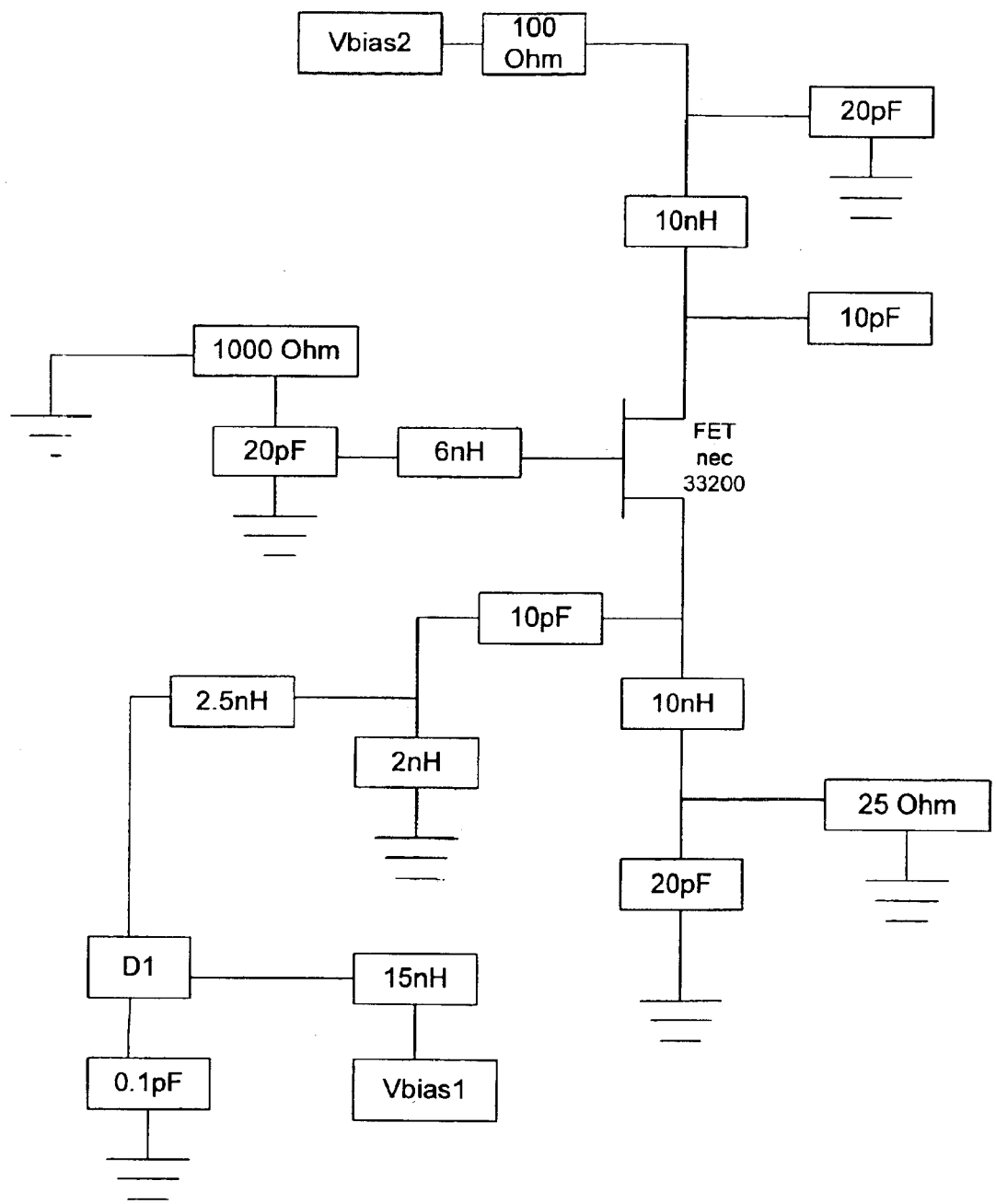
FIG. 6 is a schematic block diagram of the second transmitter according to the embodiment of FIG. 5.

FIG. 6 is a schematic diagram of the Ku band VCO (12.93–13.83 GHz) circuit. The operating principles of this VCO circuit are identical to those of the X band VCO. The difference between them is in the values of the RF elements that terminate the Gate and the Source of the FET. By changing the tuning voltage from 4.5 to 5.5 Volts, the frequency changes from 12.93 to 13.83 GHz, respectively.

Figure 7:
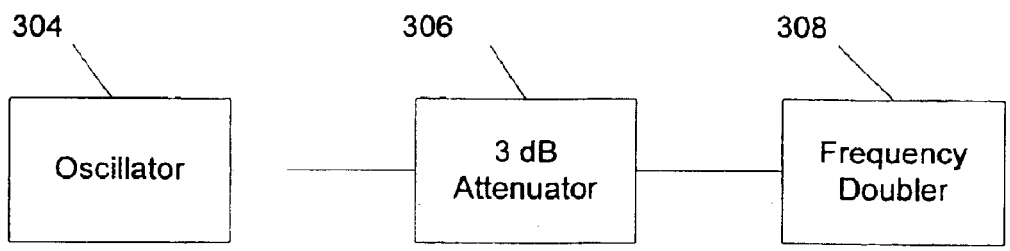
FIGS. 7 to 10 are schematic block diagrams of the third transmitter according to the embodiment of FIG. 5.

FIG. 7 is a schematic block diagram of the K band VCO (24.00–24.27 GHz), comprising a sequential connection of an oscillator 304, a 3 dB attenuator 306 and a frequency doubler 308.

Figure 8:
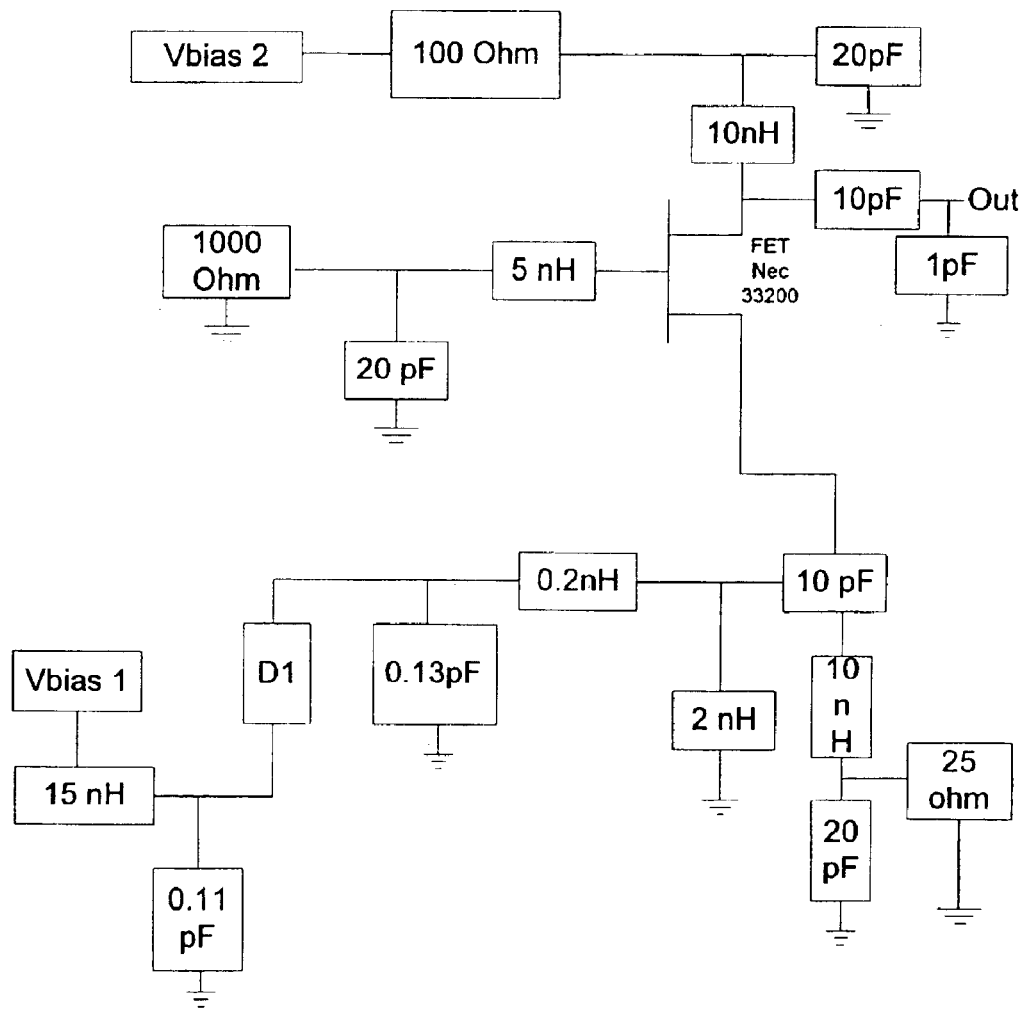

FIG. 8 is a schematic diagram of the oscillator 304 of the K band VCO. The oscillator is similar to that of the X and Ku band VCOs. By changing the tuning voltage from 3.9 to 4.9 Volts, the frequency changes from 12 to 12.135 GHz, respectively.

Figure 9:
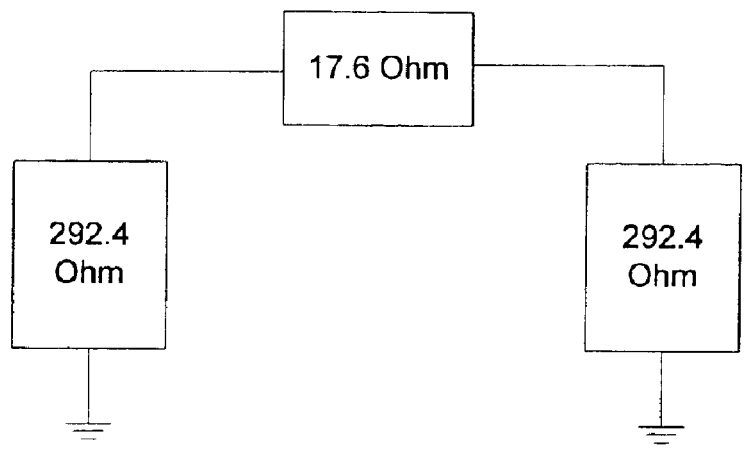

FIG. 9 is a schematic diagram of the attenuator 306 of the K band VCO. The attenuator comprises three Thin-Film printed resistors.

Figure 10:
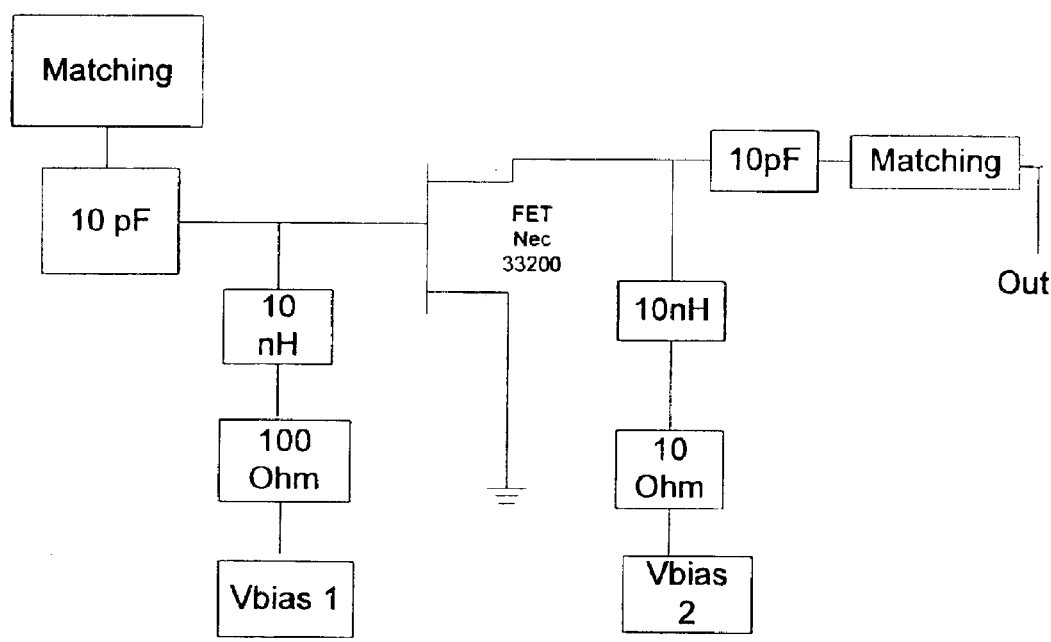

FIG. 10 is a schematic diagram of the doubler 308 of the K band VCO. The doubler comprises a single FET active multiplier 310. By using two voltage bias supplies (+3.5V to the Drain, and −0.828V to the Gate), the FET is biased near and below its turn-on point. The sinusoidal input turns the FET on over part of its cycle. The duty cycle is controlled by the Gate voltage, and is adjusted to maximize the desired output harmonic. The output frequency of the doubler is 24 to 24.27 GHz, twice the frequency of the oscillator 304.

Figure 11:
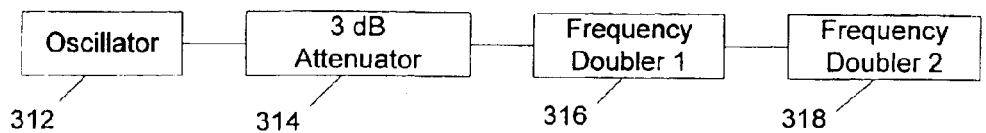
FIG. 11 to 14 are schematic block diagrams of the fourth transmitter according to the embodiment of FIG. 5.

FIG. 11 is a schematic block diagram of the Ka band VCO (33.2–36.1 GHz), comprising a serial connection of an oscillator 312, a 3 dB attenuator 314 and two frequency doublers (316, 318).

Figure 12:
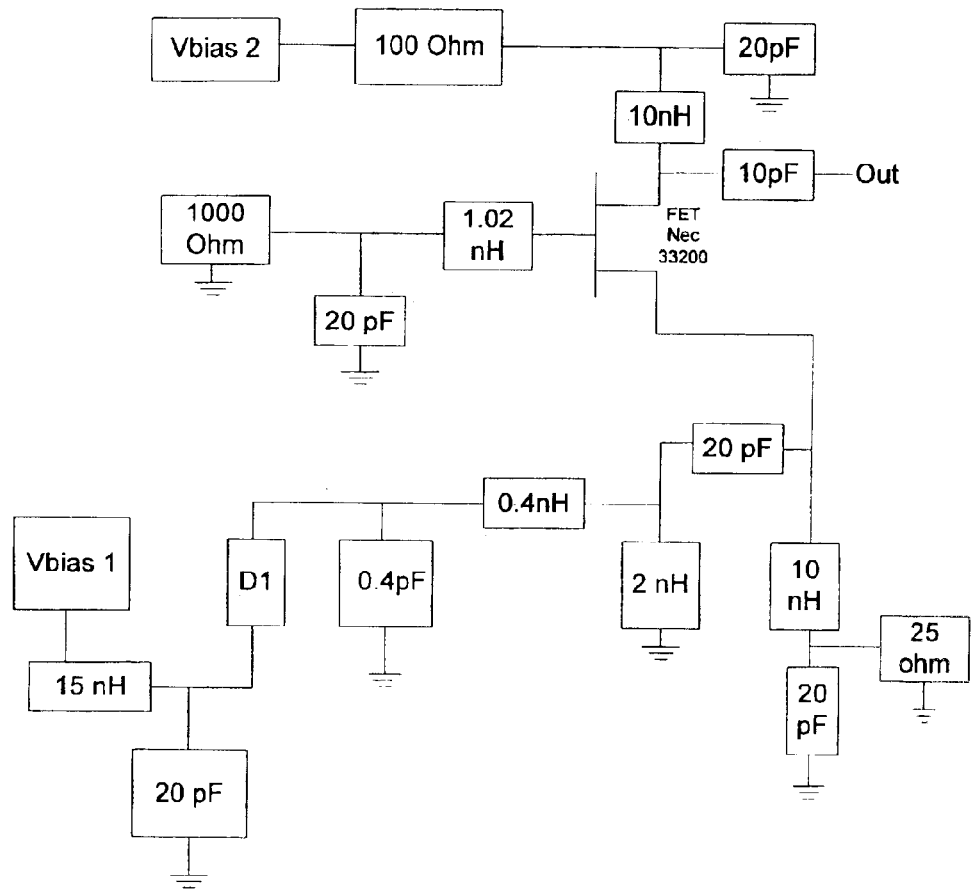

The schematic of the oscillator 312 of the Ka band VCO is depicted in FIG. 12. By changing the tuning voltage from 3 to 8 Volts, the frequency changes from 8.3 to 9.025 GHz, respectively.

Figure 13:
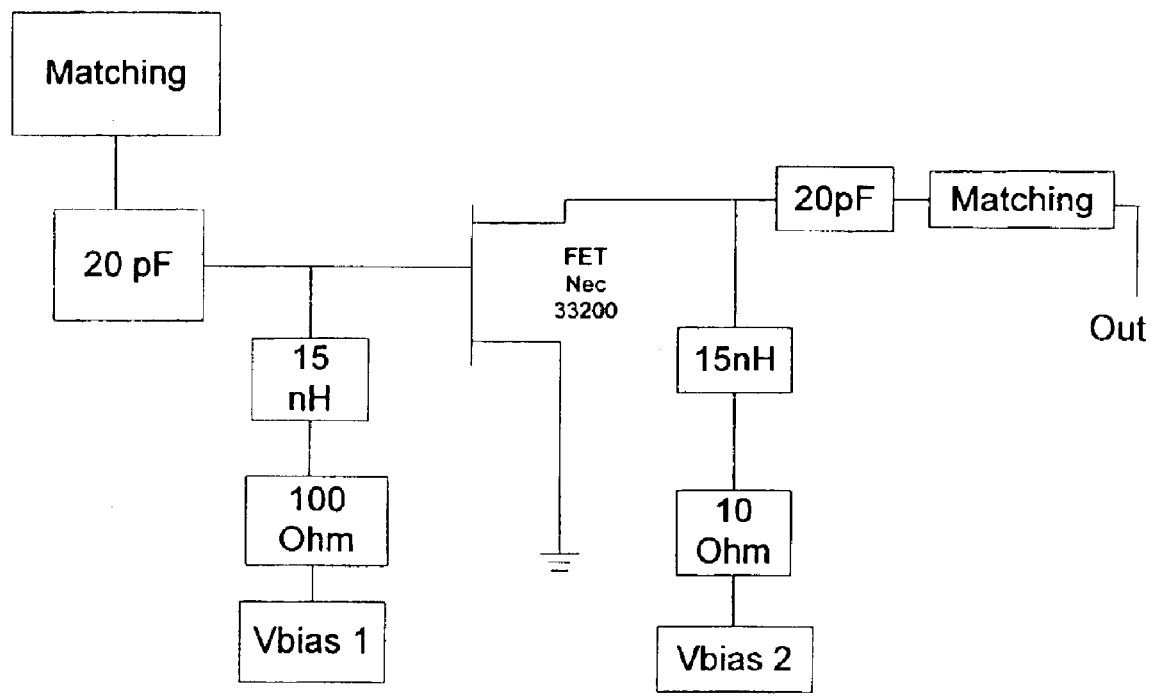
Figure 14:
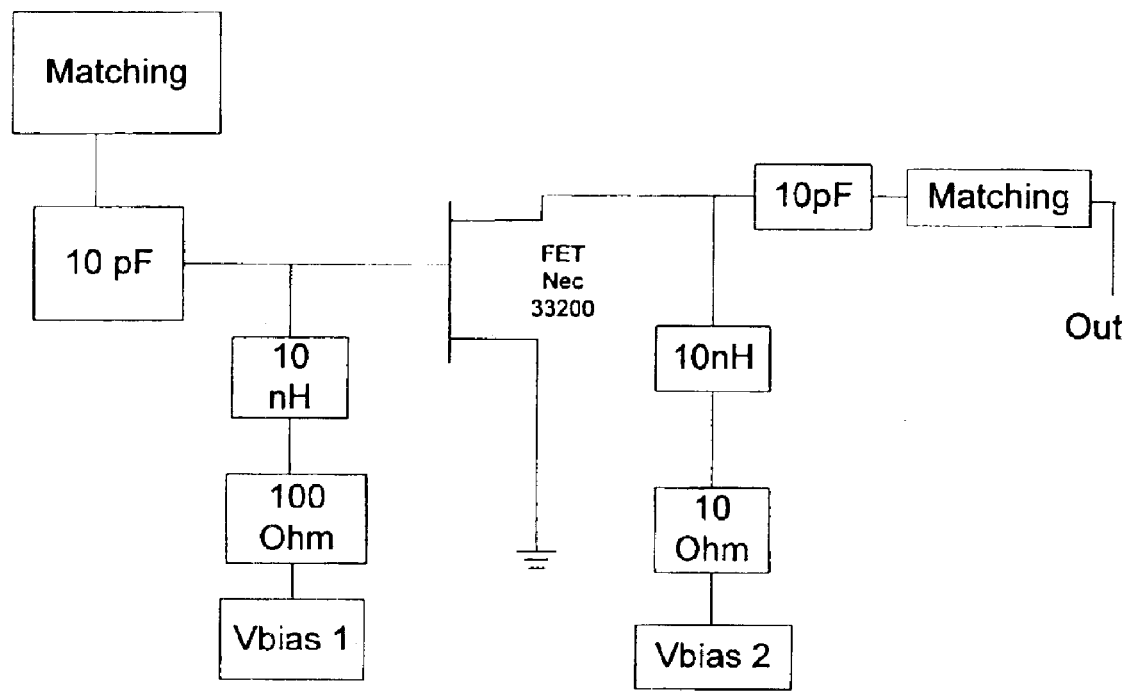

FIGS. 13 and 14 are schematic diagrams of the first and second doublers (316, 318) of the Ka band VCO, respectively.

The antennae of the transmitter unit may be based on Horn antenna, or on a patch/planar antenna to save space.

The transmitted signal is affected by the angle of the transmitter at the time of origin. All default calculations for transmissions are made assuming the transmitter units are in a level state. Correct installation and assembling of the transmitters is crucial for achieving accurate performance. The transmitter should be installed in a level horizontal manner. A spirit level may be used for horizontal (and/or vertical) alignment of the transmitters. Each transmitter unit may have an insertion slot suited to fit a designated spirit level. A single spirit level may be used as a detachable unit, and may be coupled/separated to all transmitters.

Figure 15A:
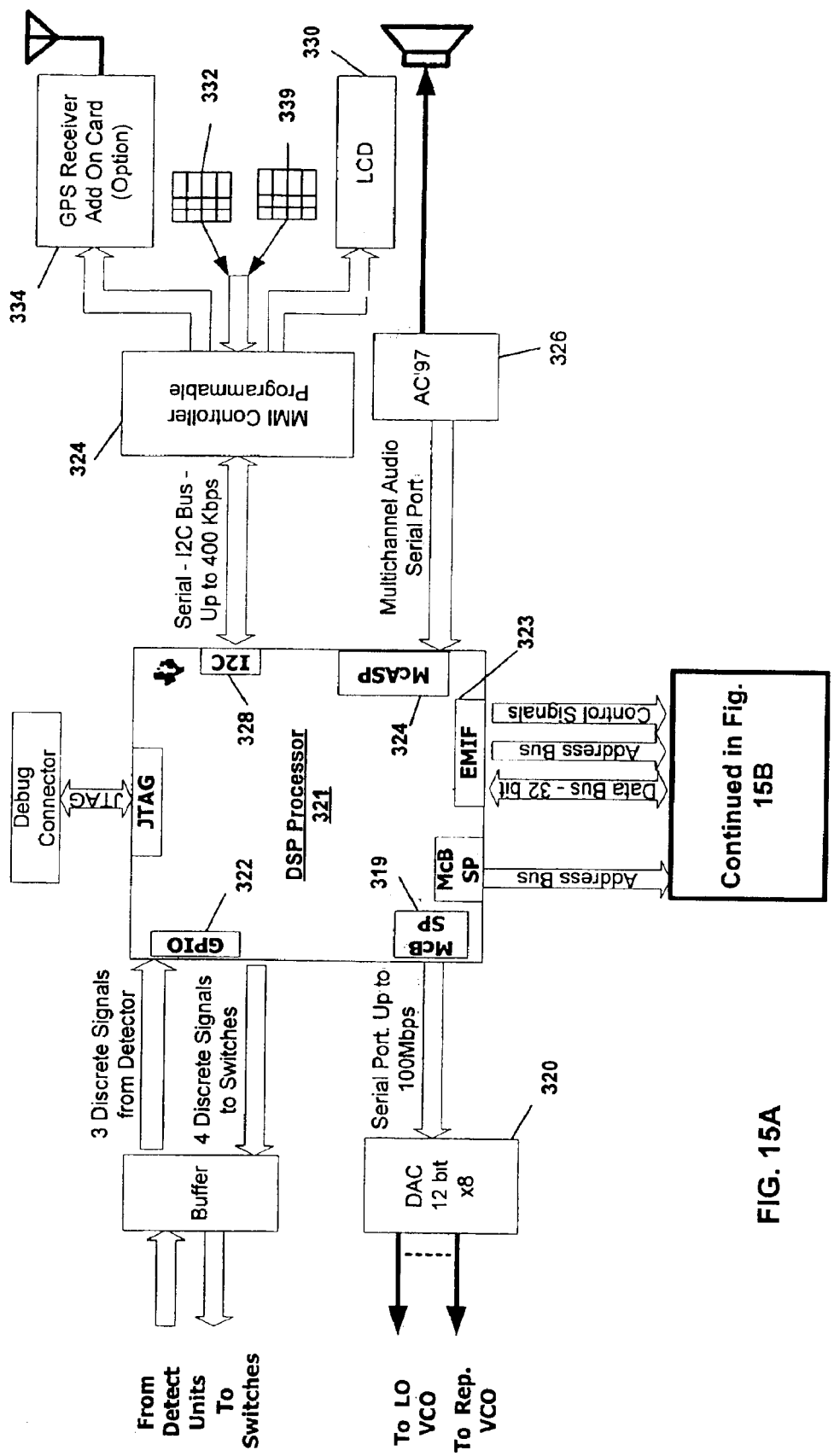
FIGS. 15A and 15B are a schematic block diagram of the control center according to a preferred embodiment of the present invention.
Figure 15B:
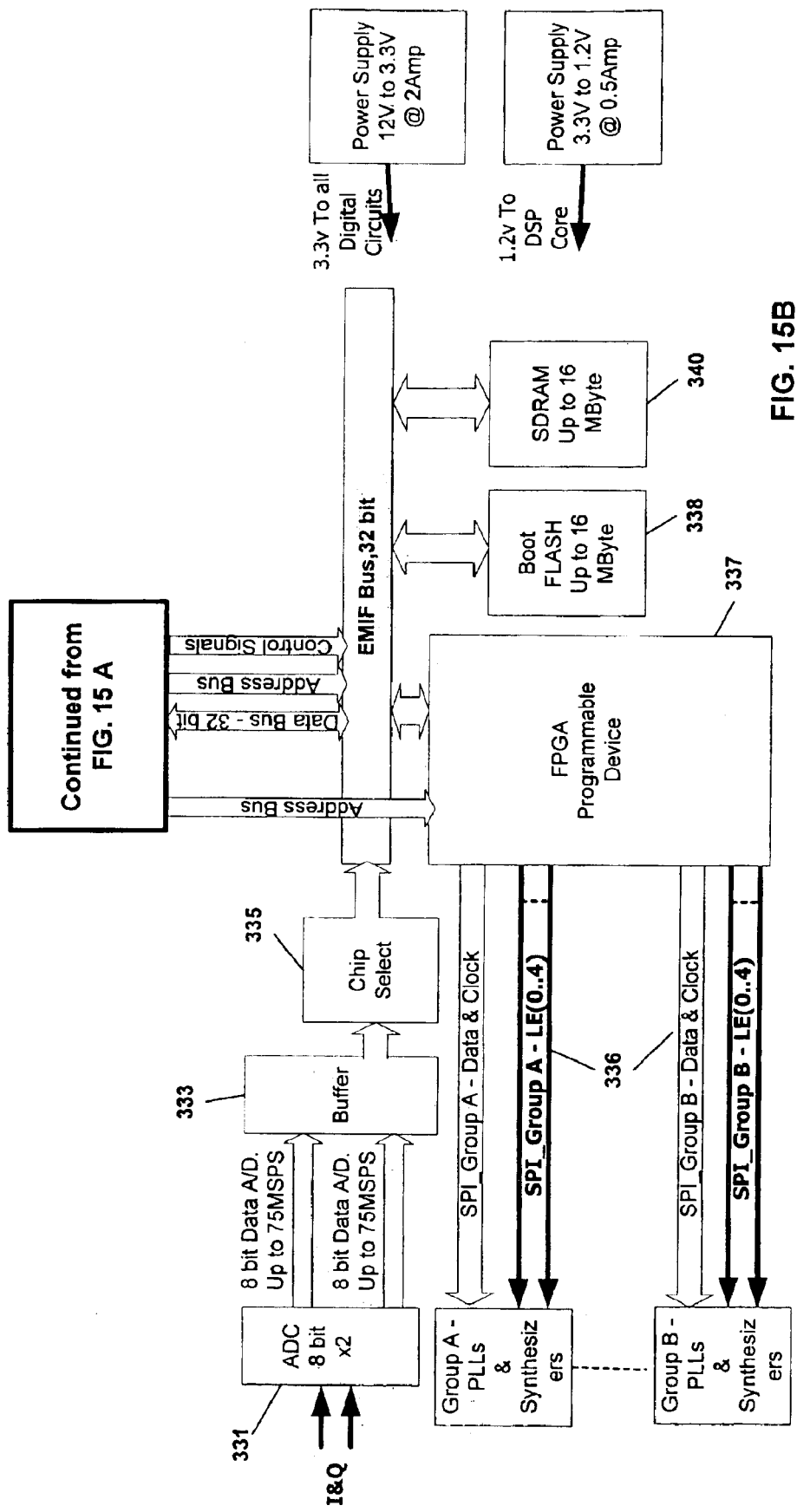

FIGS. 15A and 15B are a schematic block diagram of the control center card. The main components of the control center are:
DSP—main processor 321;
SDRAM—program and data main memory 340;
FLASH—boot memory 338;
MMI (man-machine interface) controller 324;
The DSP 321 has several dedicated ports:
EMIF (External Memory Interface)
The EMIF port 323 interfaces four components, each in a different chip select memory space: synchronous DRAM (SDRAM) 340, asynchronous ROM (FLASH) 338, parallel analog-to-digital (ADC) 331, which interfaces the EMIF through buffer 333 and FPGA 337. The EMIF supports glueless interface to SDRAM, ROM and FPGA.

The DSP 321 has a complete SDRAM controller, which is in charge of transferring data from the SDRAM to the DSP under user configured memory address mapping. The asynchronous ROM 338 is configured similarly.

The parallel A/D 331 constantly sends information to the DSP via buffer 333. The DSP controls the buffer and reads information when it is needed. The buffer 333 is connected between the DSP 321 and the A/D 331 and has its own chip select 335.

A programmable asynchronous interface may be configured for interfacing the FPGA 337. The user may determine the length of the write and read cycles by configuring dedicated registers in the FPGA, to determine read/write setup, strobe and hold time in CPU cycles. The FPGA 337 is used to control five frequency synthesizers via a serial interface, based on a serial clock, data, load enable, reset and lock indicator. Each of the synthesizers has its own serial bus, plus two extra lines 336 for reset and lock. The only interface to the DSP 321 is by control registers residing within the FPGA 337 and accessible to the DSP via the EMIF port 323 in an asynchronous mode.

Technical data of the EMIF:
Bus width: 32-bit
Number of memory spaces: 4
Addressable space: 512 Mbytes
Synchronous clocking: independent ECLKIN
Width support: 8/16/32 bit The DSP requires an external clock source (ECLKIN) to be provided by the system. The ECLKOUT signal is generated internally (using the ECLKIN). All memory units interfacing with the DSP should be operated from the ECLKOUT (EMIF clock cycle).

The SDRAM 340 and asynchronous signals are combined. All memory types may be used, since no background refresh is performed. The SDRAM interface is flexible, allowing interfaces to a wide range of SDRAM configurations.

McBSP (Multichannel Buffered Serial Port)
The McBSP 319 is a serial port that interfaces directly to serially connected digital-to-analog (D/A) devices 320 including 8 analog ports. The analog ports are used for controlling, four repeater VCOs and three analog gain controls (for reference). The core of the DSP 321 communicates with the McBSP 319 via 32-bit wide control registers accessible via the internal peripheral bus. The control block of the DSP 321 consists of internal clock generation, frame synchronization signal generation, the control of these signals and multi channel selection. This control block sends notification of important interrupts to the CPU and events to the DMA/EDMA controller via the four signals.

The D/A converter 320 features:
8 analog channels
1 digital serial port
Rate of 400K sample/sec for each channel
14-bit resolution The output of the DAC 320 is connected to analog controls of the Receiver at 230 FIG. 2A and 261,262 FIG. 2B, changing the reference voltage of the comparator in case the signal is very high in amplitude.

The remaining outputs of the DAC 320 can be connected to the tuning voltage of the free run VCOs used in the transmitter of the alternative configuration (not a synthesized transmitter), as described in conjunction with FIGS. 5 to 14, helping in sweeping the transmitter output frequency while the jamming mode is operated. During the calibration mode, the DSP 321 sweeps the VCOs in order to update the needed tuning voltage of the VCOs to be synchronized with the receiver LOs.

GPIO (General Purpose Input Output)

The general-purpose input/output (GPIO) peripheral 322 provides dedicated general-purpose pins that can be configured as either inputs or outputs. When configured as an output, the user can write to an internal register, to control the state driven on the output pin. When configured as an input, the user can detect the state of the input by reading the state of an internal register. In addition, the GPIO peripheral can produce CPU interrupts and EDMA events in different interrupt/event generation modes. Some GPIO pins are MUXed with other device pins.

The control center uses the GPIO 322 to control the switching elements and for discrete input. There are up to 16 lines: three are used as inputs from the receiver detectors (258 FIG. 2B, 228 FIG. 2A) and six are used for outputs controlling the IF down converters switches (223, 224, 225, 227, 240 FIG. 2A).

McASP (Multichannel Audio Serial Port

The McASP 324 interfaces a stereo audio Codec 326 with sample rates from 8 kHz to 96 kHz.

Features of the Codec:
  Stereo-line inputs
    Integrated Programmable Gain Amplifier
    Analog Bypath Path of Codec
  ADC multiplexed input for stereo-line inputs and microphone
  Stereo-line outputs
    Analog stereo mixer for DAC and analog bypass path
  Analog volume control with mute
  High efficiency linear headphone amplifier
    30 mW into 32 Ohm from a 3.3-V analog supply voltage

I2C

The I2C 328 port interfaces to MMI (Man-Machine Interface) controller 324 in a maximum rate of 400K bit/sec. This port functions according to the protocol standards.

The MMI controller 324 is pre-programmed to devices such as:
  LCD 330—with a dedicated port
  Keypad 332—with a dedicated port
  GPS 334—with a UART interface
  PDA 339

Data-Flow in the Control Center

1. The receivers constantly sweep the bands and a discrete signal (258, FIG. 2B) is sent from the receiver IF to the GPIO 322 pin of the DSP 321, to indicate RF signal detection in a certain band (using switches 224, 225, 227, 240 of FIG. 2A). According to the band detected, the frequency data is sent from the FPGA 337, to control the synthesizer PLL (268, FIG. 3). The input signal (I/Q) is compared in the DSP 321 to the reference signal (output of the local oscillator) and the IF LOs are constantly changed to minimize the difference (in frequency) at the I/Q (262, FIG. 2B). The difference is calculated by the DSP 321 (using an FFT process). The DSP receives the two signals (I/Q) through parallel A/D 331 in a two-phasor signal format (complex I and Q) and analyzes the phasor. If the signal difference is smaller than a given frequency (e.g. 1 kHz), the input signal is considered as "matched". When a match occurs, the DSP 321 stops sweeping the bands. If no match has occurred, the procedure is repeated with a more accurate signal. The match is a discrete signal (lock indicator) from the PLL frequency synthesizer (268, FIG. 3).]

2. There is data flow from the DSP 321 to the LCD 330, keypad 332, PDA 339 and GPS 334. The keypad is used by the end-user to enter special preferences, code etc. The DSP reads the pressed keys and responds by writing to the LCD. The PDA 339 may be used to interface the user to the control center, instead or in addition to the LCD 330 and keypad 332. The PDA 339 may be connected with the control center in either wired or wireless communication, e.g. Bluetooth. The PDA 339 may also be used for downloading the DSP executable program into the control center, to be preferably used for updates. The GPS is used to read real time and location of events. The GPS is an add-on feature that can help the user to preprogram his route and mark down all the points suspected as speed traps. The DSP will execute the jamming program when needed in order to "blind" those speed traps.

3. Data flow from the DSP 321 to the FPGA 337 serves for configuring the features of the synthesizers' (S1–S4, FIG. 3) controls. Data flow from the FPGA to the synthesizers control lines controls the functionality of the synthesizers, e.g. frequency sweeping lock indication ex.

Figure 16:
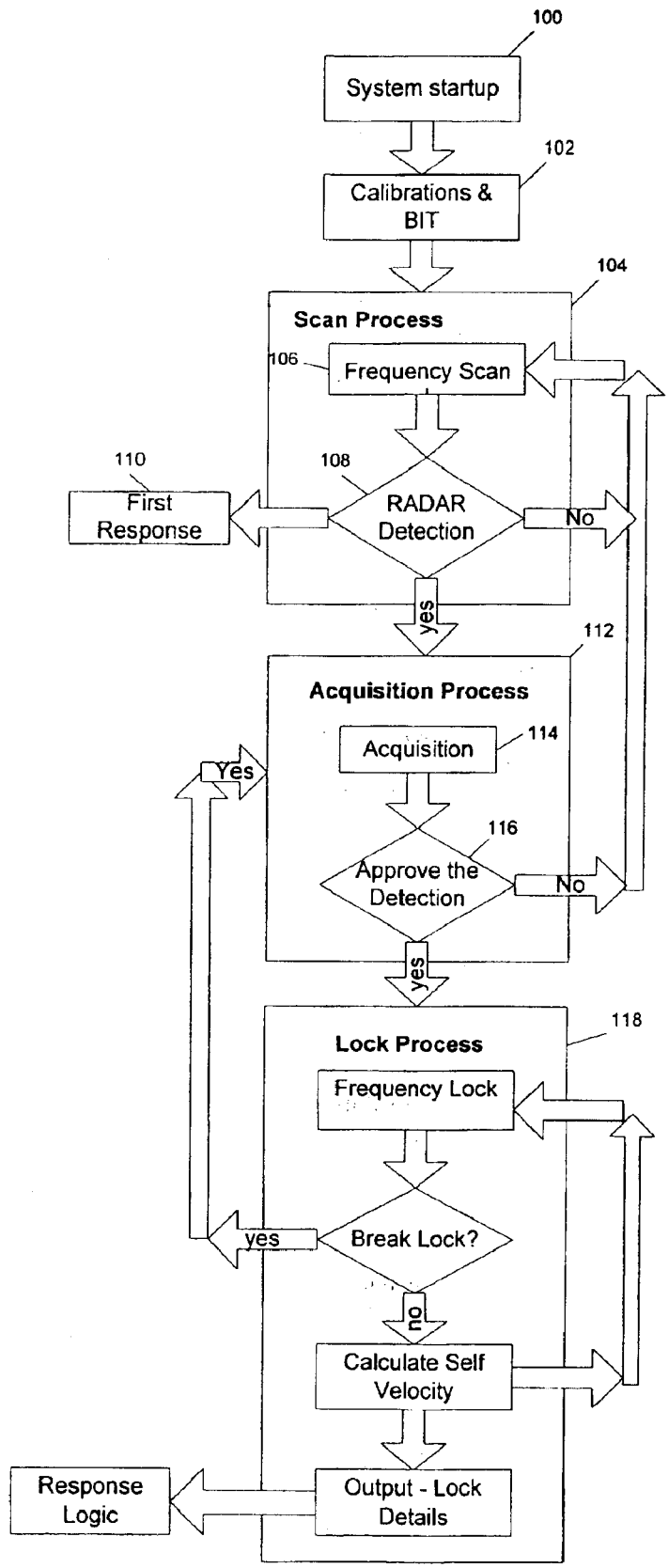
FIG. 16 is a general flowchart of the operation procedure of the present invention.

FIG. 16 is a schematic block diagram of the general workflow of the system of the present invention. After system startup in step 100, the system goes through a calibration process, and a system built-in (BIT) test, in step 102, as will be explained in detail in conjunction with FIGS. 22A and 22B. The calibration procedure will be further performed at predefined intervals. Once the system has been calibrated, normal operation starts, in step 104.

Figure 17:
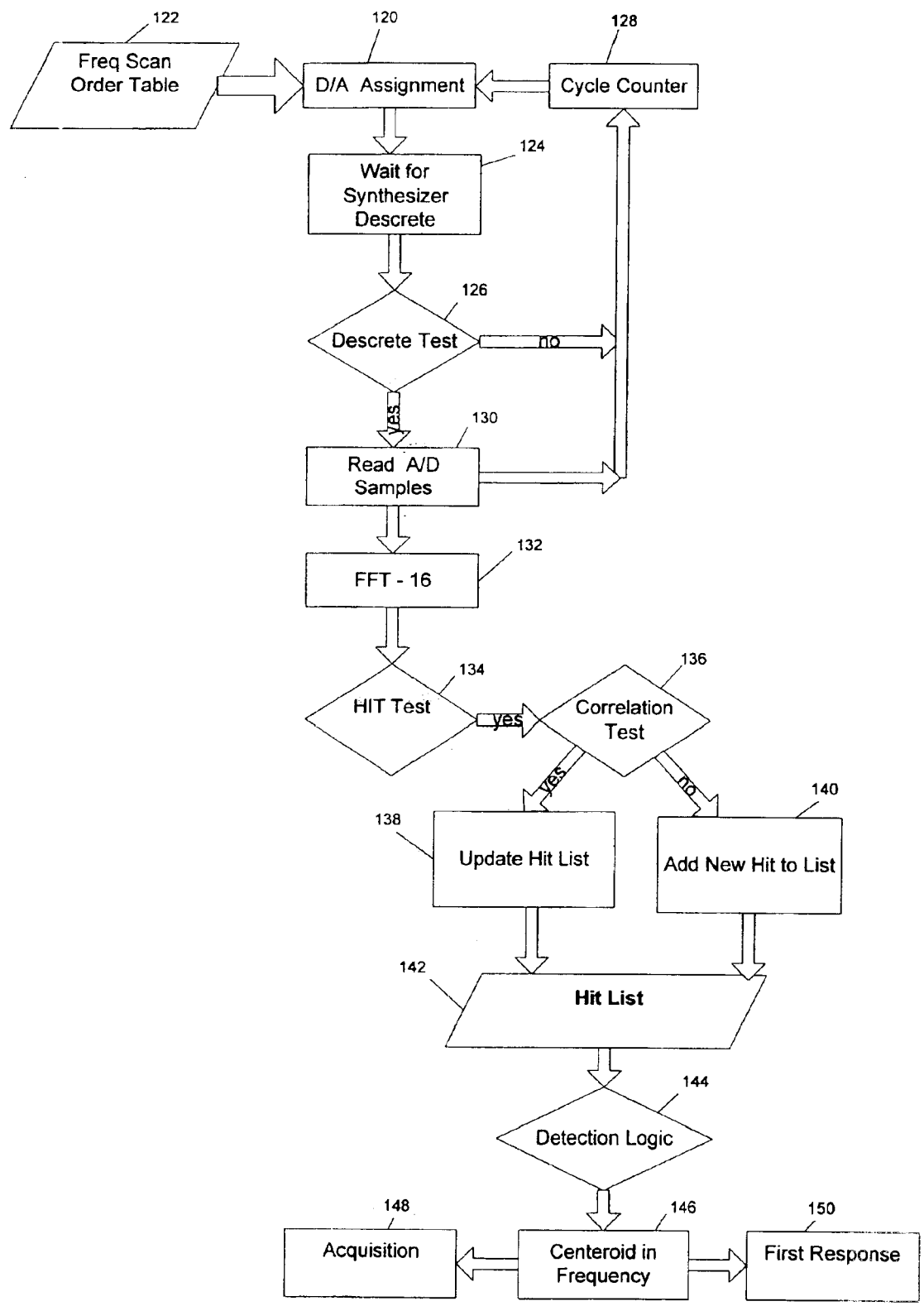
FIG. 17 is a flowchart of the frequency-scan stage according to a preferred embodiment of the present invention.

The main task of the scan process, which will be described in more detail hereinbelow with reference to FIG. 17, is to scan for Continuous Wave (CW) transmission or threat and make a fast detection of radar presence, with a low rate of false detection. In step 106, the RF synthesizer is assigned a single frequency, and once the system is stable the RF detectors are checked, in step 108, for signals. If no signal is detected, the system goes back to step 106 to scan for the next frequency. Otherwise, if the detector shows presence of a transmission, the detection logic makes a decision, based on stored past results and the present result, whether the signal is suspect as a radar signal. If it is, the system makes a fast (coarse) acquisition, in order to reduce false detection and in a parallel process, in step 110, starts active reaction to the threat.

Once radar detection has been confirmed by the detection logic, the signal is transferred to the acquisition process, in step 112, which will be described in more detail hereinbelow with reference to FIG. 18. In the acquisition step, a higher resolution signal acquisition is performed, in step 114, followed by spectral analysis, to approve radar presence and its accurate frequency. If the detection is not approved, in step 116, the system goes back to step 106 to scan for the next frequency. Otherwise, the detected signal is passed on to the lock process.

In the lock process (step 118), which will be described in more detail hereinbelow with reference to FIG. 19, the accurate frequency of the detected signal is calculated and frequency changes monitored. The lock process handles track on a single/multi frequency and continuously updates track parameters and builds adequate response, as long as radar presence is detected.

FIG. 17 is a detailed flowchart of the frequency scan process. In step 120, the D/A/DSP assigns a single frequency to the RF system, according to a dynamic frequency scan order table 122 containing all relevant frequency ranges and pre-stored radar properties for the same frequency ranges. Once the system has stabilized, in step 124, the RF detectors are tested for the presence of a transmission (step 126). If no transmission has been detected, the system returns to step 120 to scan for the next frequency, assigned by the cycle counter 128 according to frequency scan order table 122. Otherwise, if a transmission has been detected, in step 126, for the scanned frequency, a spectral analysis of a predefined number of sampled signals is made in step 130. In a preferred embodiment the number of cycles is 16. Following a positive identification by the analysis of step 130, a coarse frequency is calculated, in step 132, by a basic FFT analysis. In step 134, the calculated frequency is tested (HIT test) and if the signal has radar signal characteristics a correlation test is performed in step 136, to check whether the new hit correlates to the previous hit. If it does, the hit list 142 is updated in step 138. Otherwise, a new hit record is added to the hit list 142 in step 140. In step 144, detection criteria are applied to the hit list, to prevent false detection. In step 146, detection parameters are prepared for the acquisition process, by applying a centeroid process to the detected/chosen frequency, followed by the two parallel processes of starting the acquisition process (step 148) and transmitting a first response, based on coarse parameters (step 150).

Figure 18:
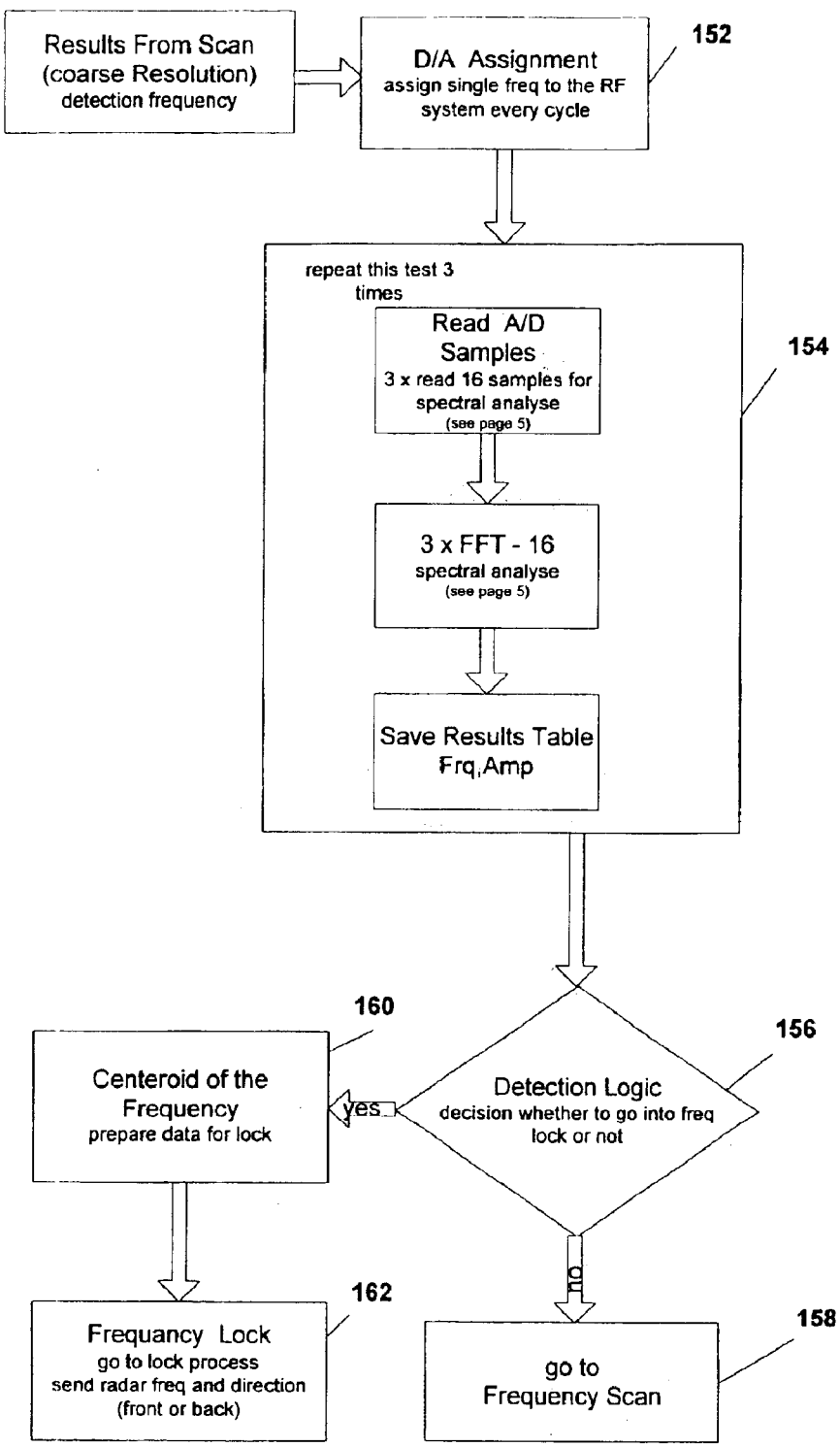
FIG. 18 is a flowchart of the acquisition stage according to a preferred embodiment of the present invention.

FIG. 18 is a detailed flowchart of the acquisition process. In step 152, a single frequency is assigned to the RF system by the D/A or DSP, as detected by the frequency scan. In step 154, the accurate frequency of the incoming signals is calculated, as will be explained in detail hereinbelow, with reference to FIG. 20. Once the accurate frequency has been calculated, a decision is made, in step 156, whether to go into frequency lock. If the decision is negative, the system goes back to the frequency scan, in step 158. Otherwise, parameters for the frequency lock (centeroid of the frequency) are prepared in step 160 and transferred to the frequency lock process.

Figure 19:
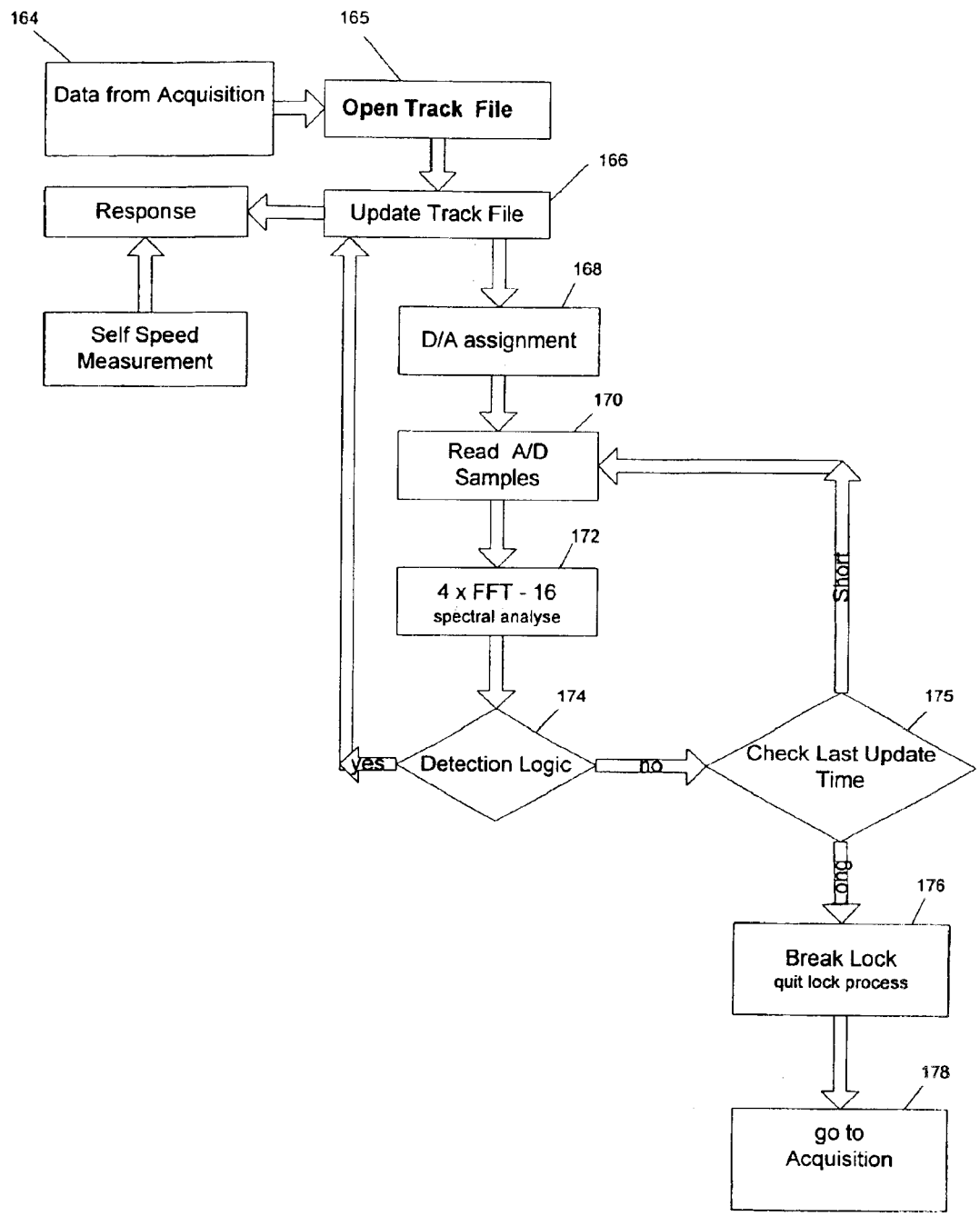
FIG. 19 is a flowchart of the frequency-lock stage according to a preferred embodiment of the present invention.

FIG. 19 is a detailed flowchart of the frequency lock process. In order to maintain a lock on one or more threats, the system builds a table recording the characteristic data (signature) of each threat. Each record is called a track file. Recording track files enables the system to jam one threat while scanning for others, also allowing switching to a different band and applying the same process. Each track file includes data such as radar source type, frequency, amplitude, frequency change rate, frequency drift rate, direction of the I/Q complex vector, last update time and lock quality. The track file may also be used for estimating the frequency of the signal in the next sweep cycle.

The locking process starts in step 164, with the initial frequency calculated by the acquisition process. A track file is opened (if not existing), in step 165, for the detected frequency and is continuously updated, in step 166. If frequency hopping is detected, it will be reflected in the track file data. The detected signal signature is compared with the entries of table 122, to positively identify the radar source type. The identified radar source type is stored in the track file to be optionally used later for selecting a jamming technique. In step 168, the D/A or DSP assigns the current lock frequency to the RF system, followed by preferably four cycles of FFT spectral analysis on a predefined number of consecutive samples, to calculate accurate frequency (steps 170, 172). In a preferred embodiment the number of samples is 16. In step 174 a decision is made whether the calculated frequency has radar characteristics. If the decision is negative, the time-lapse since the last transmission in the same frequency is read from the track file (step 175). If the time lapse is longer than a predefined value, the locking process is abandoned in step 176 and in step 178 the system goes back to the acquisition process, for another trial to lock before returning to the frequency scan process. If the time lapse detected in step 174 is shorter than the predefined value, the system goes back to step 170, for a new frequency calculation.

Figure 20:
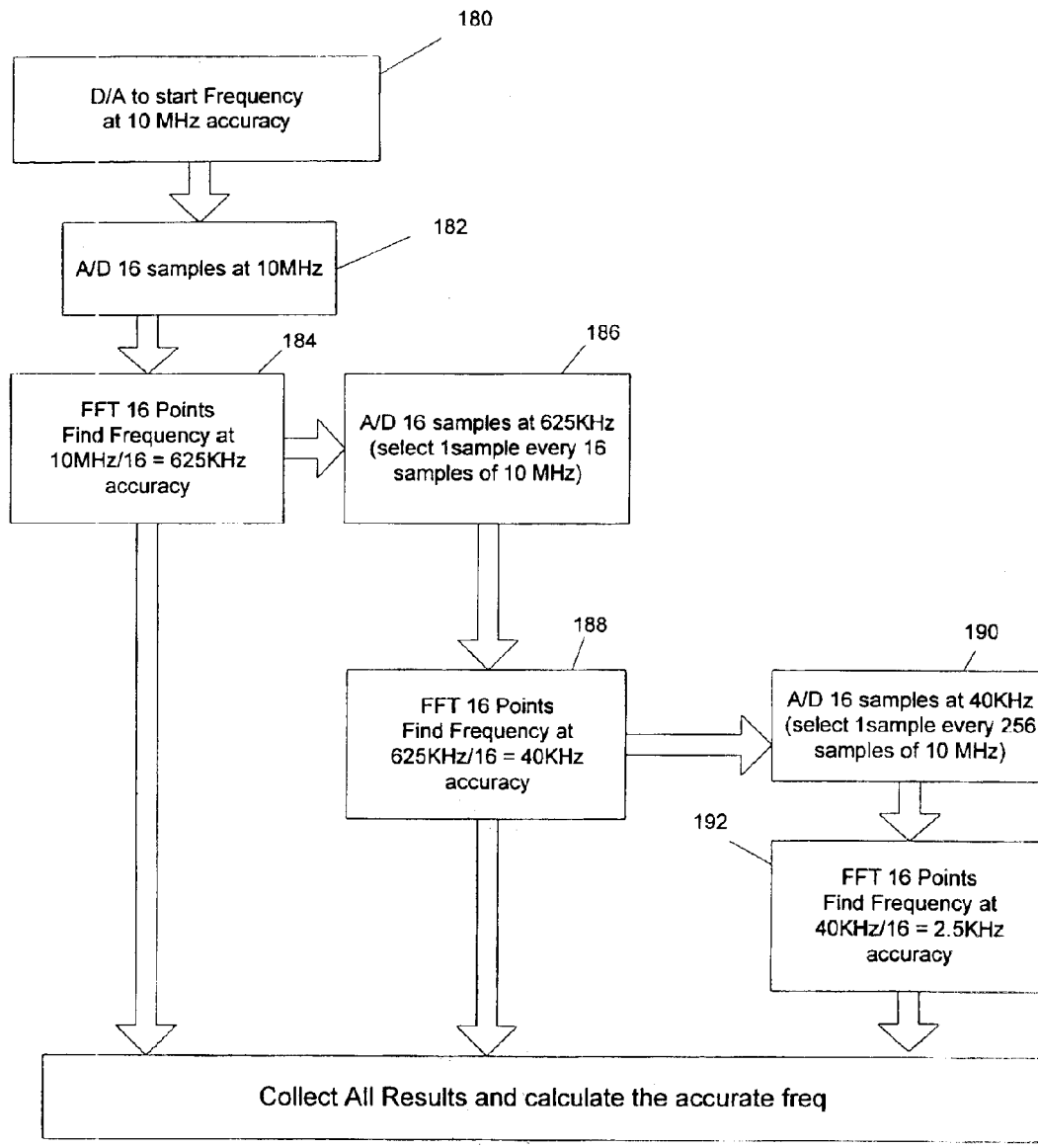
FIG. 20 is a flowchart of the frequency detection algorithm according to a preferred embodiment of the present invention.

FIG. 20 is a detailed flowchart of the frequency calculation process. In step 180, the D/A or DSP initially sets the frequency to a start frequency, according to the frequency scan order table 122, at 10 MHz resolution. 16 samples are taken from the A/D in step 182 at 10 MHz and in step 184 a 16-point FFT is applied to the signal, to define in which of the 16 filters the detection is located, within the resolution of 10 MHz/16=625 KHz. Next, in step 186, 16 samples are taken at 625 KHz, by selecting one sample out of every 16 samples of 10 MHz. In step 188, a 16-point FFT is applied to the signal, to define in which of the 16 filters the detection is located, within the resolution of 625 KHz/16=40 KHz. Next, in step 190, 16 samples are taken at 40 KHz, by selecting one sample out of every 256 samples of 10 MHz. In step 192, a 16-point FFT is applied to the signal, to define in which of the 16 filters the detection is located, within the resolution of 40 KHz/16=2.5 KHz. The results of all three stages are stored and the accurate frequency calculated therefrom. It will be understood by anyone skilled in the art that the number of samples taken may be any other predefined number. It will also be understood that the number of filters at each stage of the FFT analysis is not necessarily 16, but can rather be determined according to the desired resolution. The number of division steps may also vary.

Figure 21:
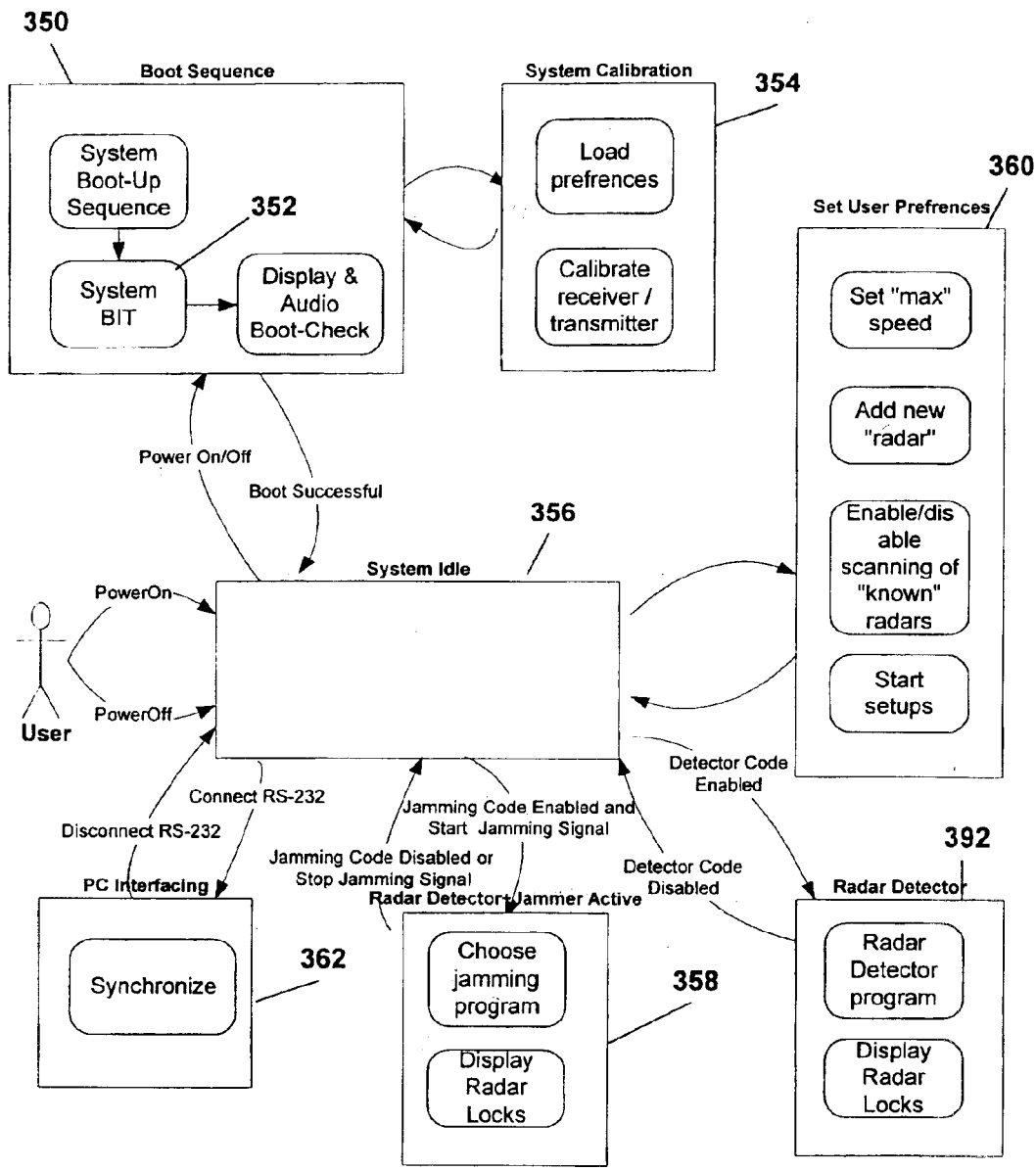
FIG. 21 is a block diagram of the various system states according to a preferred embodiment of the present invention.

FIG. 21 is a block diagram describing the various system states.

The system receives a "power-on" signal, which initiates the boot sequence 350. The boot sequence 350 includes a Built-In-Test (BIT) 352 for each of the system's elements.

After the boot sequence is completed successfully the system continues to a calibration state 354.

After calibration completes successfully the system enters a temporary idle state 356 from which there are several possibilities:

a. If the jamming code is enabled the system enters the jamming sequence 358 and runs the jamming program. Otherwise, if the jamming code is disabled and the radar-detector is enabled the system enters the radar-detector program 392. If both codes are disabled the system remains locked.

b. If the setup button is pressed the system stops any running program and enters the "setup" mode 360.

c. If the system detects that port RS-232 is active, i.e. connected to a PC terminal, the system enters a synchronization sequence 362, downloading and uploading necessary data.

Figure 22A:
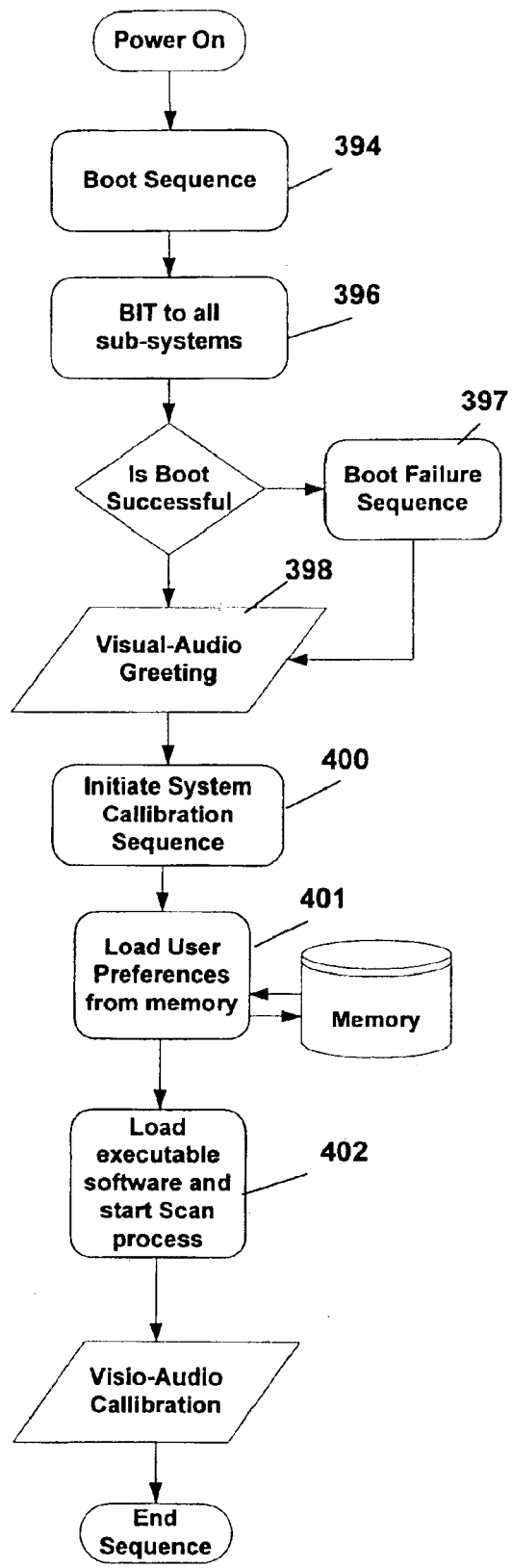
FIG. 22A is a flowchart of the boot and calibration process according to a preferred embodiment of the present invention.

FIG. 22A is a detailed flowchart of the Boot & Calibration sequence 350:

Boot Sequence (step 394):

1. Boot starts at address 000
2. Initialization of all registers

In step 396 BIT is sequentially applied to all subsystems—Serial Ports, SDRAM, Flash Card, display (WRITE predetermined string, and READ it back), D/A (INPUT a predetermined signal for which the output is known and compare it with the OUTPUT signal returned), receivers/transmitters (transmit a predetermined signal and compare it with the received signal). If all BIT tests return SUCCESS=TRUE, display and sound opening greeting (step 398). A logging system records in system memory any faults or malfunctions detected in the BIT (step 397). The recording includes malfunction type and time.

Calibration Sequence (step 400):

1. Load frequency band tables from memory.
2. Load user preferences from memory (step 401). User preferences may include: Visual/audio setups, jamming program selection, region-specific bands and frequencies, speed measure units (kph/mph), etc.

3. Calibrate receivers and transmitters (when using a Free Run VCOs) to add new value to the table frequencies.
4. Calibrate display to active mode with user preferences.

Once the calibration process has been completed, the normal operation of the system starts by loading the executable software from the SDRAM 340 into the DSP 321 and starting the scan process (104, FIG. 16)

Figure 22B:
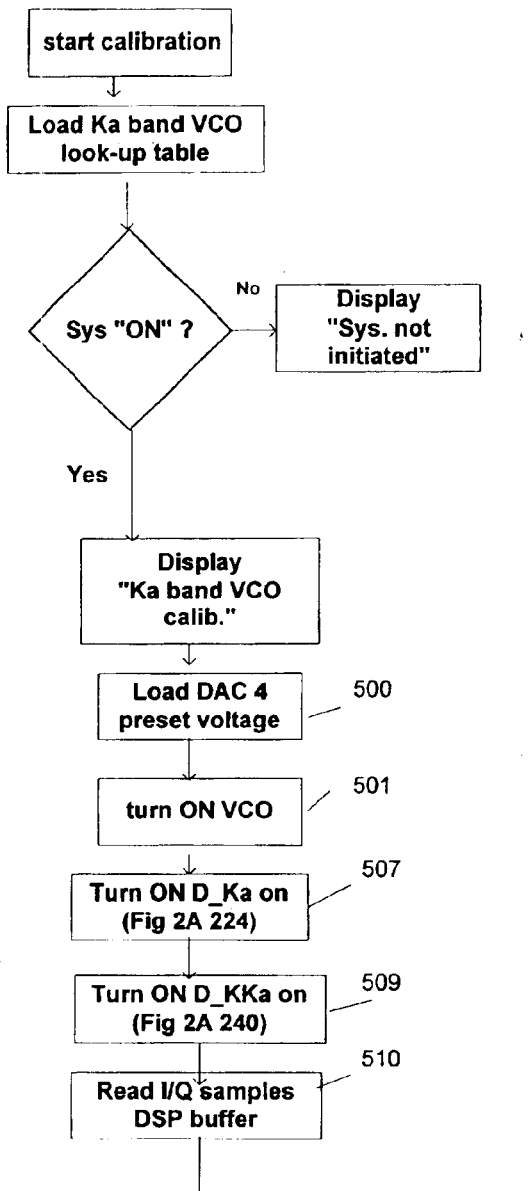
FIG. 22B is a flowchart of the calibration process of the RF system according to a preferred embodiment of the present invention.
Figure 22B:
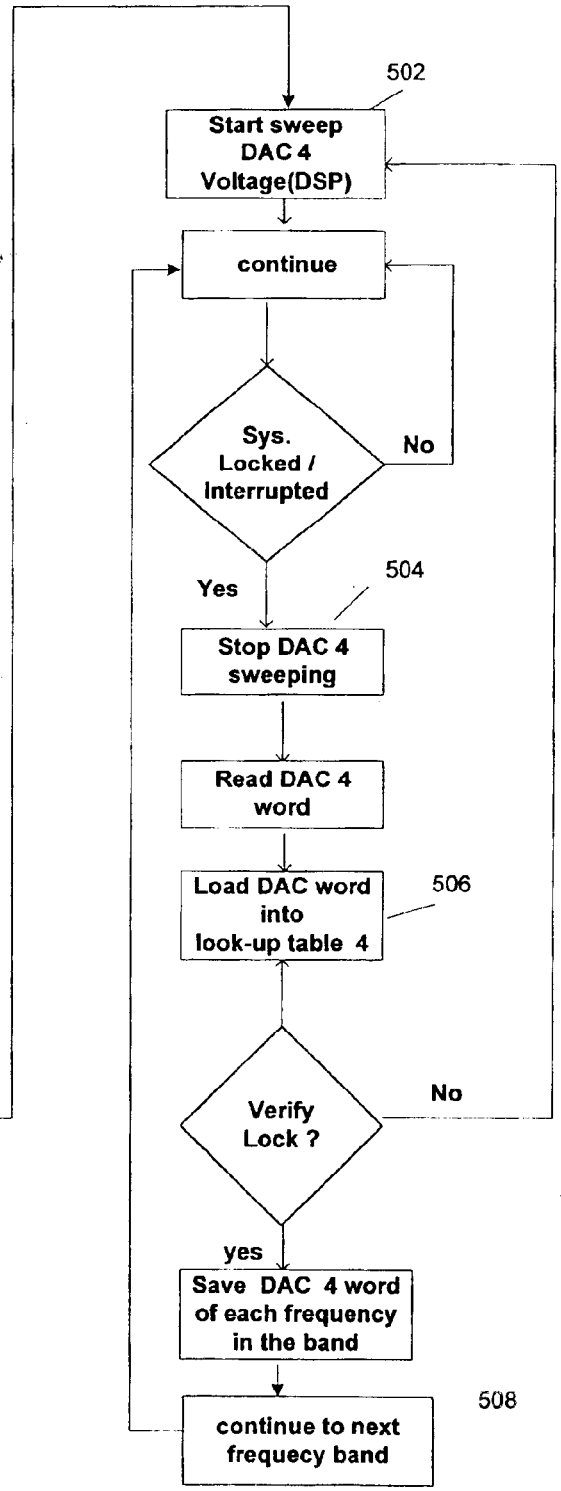

FIG. 22B is a detailed flowcharts of the calibration process of the RF system. The RF system (Free Run VCOs 50, FIG. 1) is unstable, and cannot hold a constant stable signal. In other words, the signal frequency continuously "drifts" away from the original signal. To overcome the drifting the system maintains a set of temporary tables in memory, which hold all original frequency signals that were used during calibration, filtered and sorted as possible starting frequency value. The calibration process compares the current RF signal position with the table records.

The calibration procedure is initiated by the control center upon system startup and on a regular time basis, depending on the LO VCO stability.

In step 500, the default address word, related to the voltage required to drive the Ka band VCO, is loaded from a look-up table stored in SDRAM 340 (FIG. 15B) into DAC4 (320, FIG. 15A), through the DSP serial bus 319 (FIG. 15A), allowing the Ka band VCO to start at a pre-calculated frequency. The VCO is then turned on, in step 501 and switches D_KaOn and D_KKaOn are switched on (steps 507, 509). In step 502 the control center starts to run the DAC4 voltage from the pre-calculated frequency (step 510), until a lock is indicated by the I/Q outputs (FIG. 2B) that are connected to the DSP through ADC 331 (FIG. 15B). Once the software determines that lock has occoured (using the FFT process of FIG. 20), it causes the DAC4 320 to stop sweeping (step 504). The current word is loaded into the control center look up table 4 (step 506). Since each band includes multiple frequencies, the DSP continues to sweep for other frequencies in the Ka band, to store multiple frequency values (voltage corresponding to frequency) in the look up table (step 508).

The calibration procedure for the other bands follows in a similar manner.

Figure 23A:
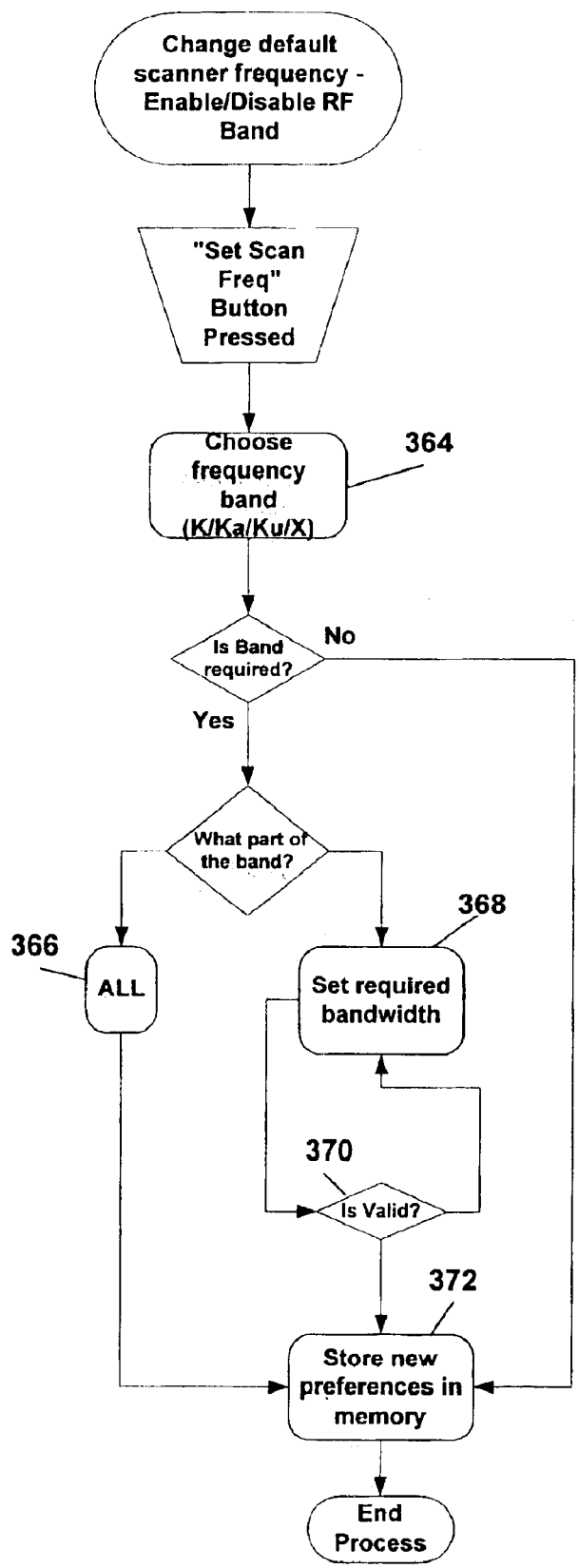
FIGS. 23A and 23B are flowcharts of the process of enabling/disabling RF-Band scanning according to a preferred embodiment of the present invention.

FIG. 23A is a detailed flowchart of the process of enabling/disabling RF-Band scanning. The system stores a table of all known radio frequencies in any band in which radars operate. The table also stores the operating frequency bandwidth for all commercial radar models or types. The user may disable/enable entire bands or just selected segments in circumstances where they are not necessary.

To enable/disable detector-jammer operating frequencies:
a. The user chooses the radar operating-band (e.g. Ku Band) (step 364).
b. Two possible settings:
  i. Scan the entire band (step 366)
  ii. Scan some selected frequencies within the band (where known radars operate) (step 368)
c. Option b. further allows choosing the specific BW section.
d. The frequency is validated (step 370) before storing in memory (step 372).

Figure 23B:
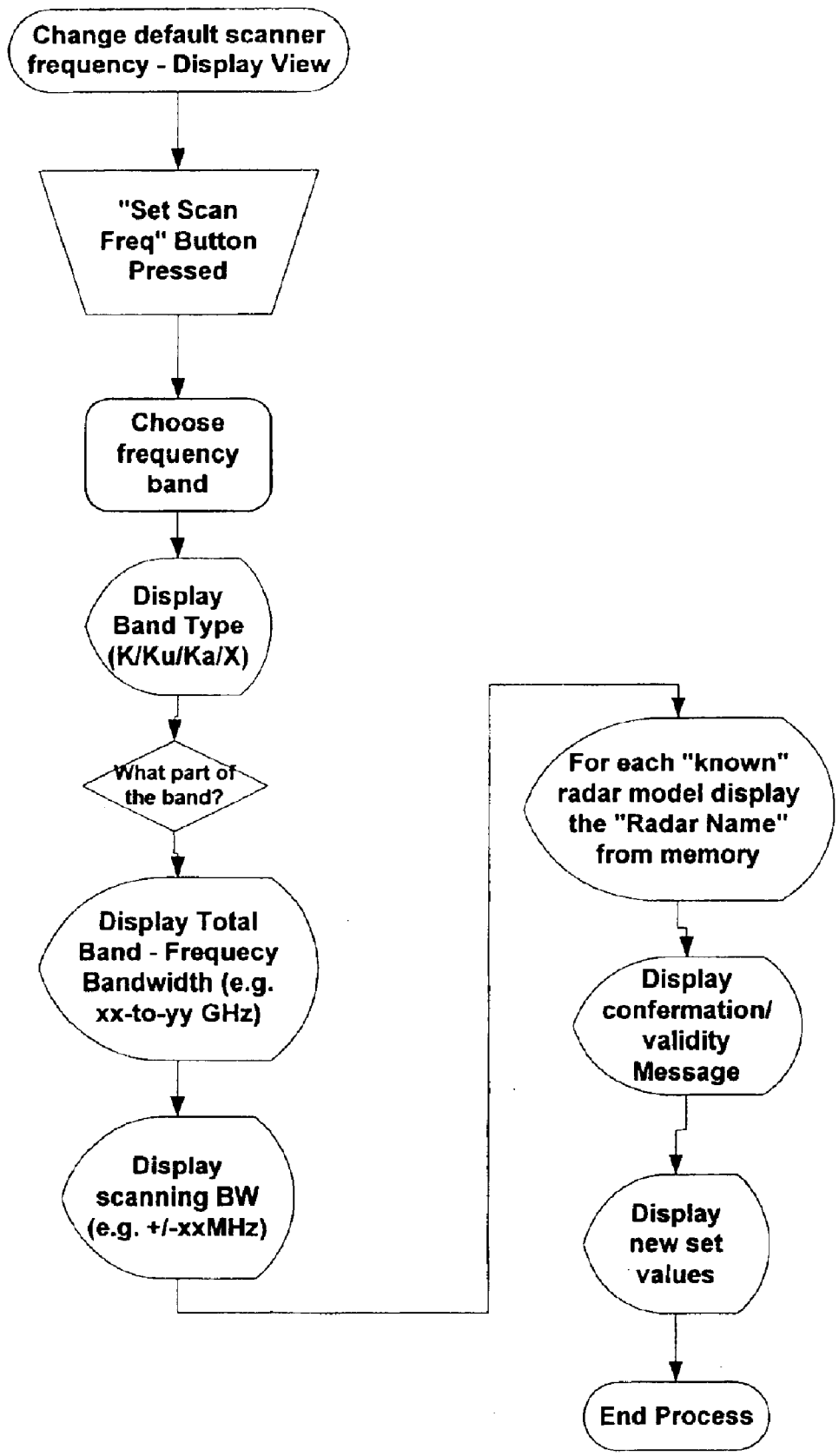

FIG. 23B is a flowchart of the display functionality for user interaction when performing the enable/disable RF-Band scanning procedure of FIG. 23A.

Figure 24:
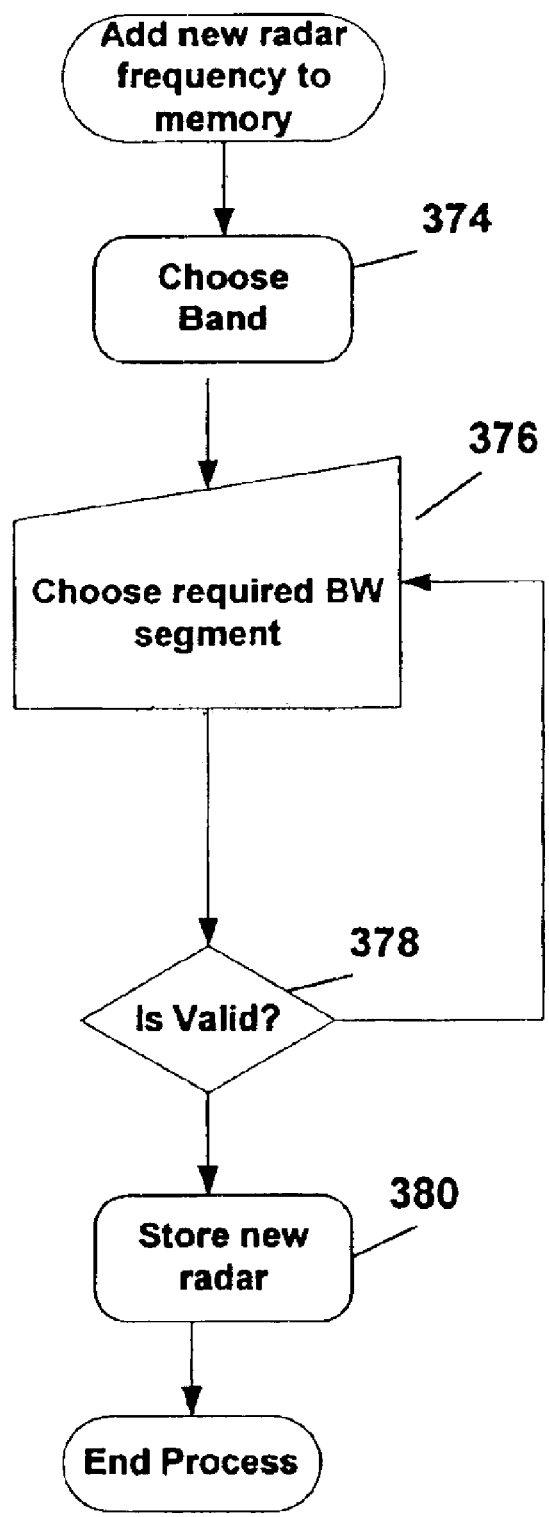
FIG. 24 is a flowchart of process of adding a new radar to memory according to a preferred embodiment of the present invention.

FIG. 24 is a flowchart describing the procedure of Add new Radar to memory for scanning. The user may add to memory new radars that are not found in the factory settings.

To add a new band:
1. The user chooses the radar operating band (e.g. K Band) (step 374).
2. The user is presented with a display of the frequency range (start-to-finish) of the chosen bandwidth.
3. The user can sweep through the frequency range until the needed frequency is reached (step 376).
4. The frequency is validated (step 378) before storing in memory (step 380).

Figure 25:
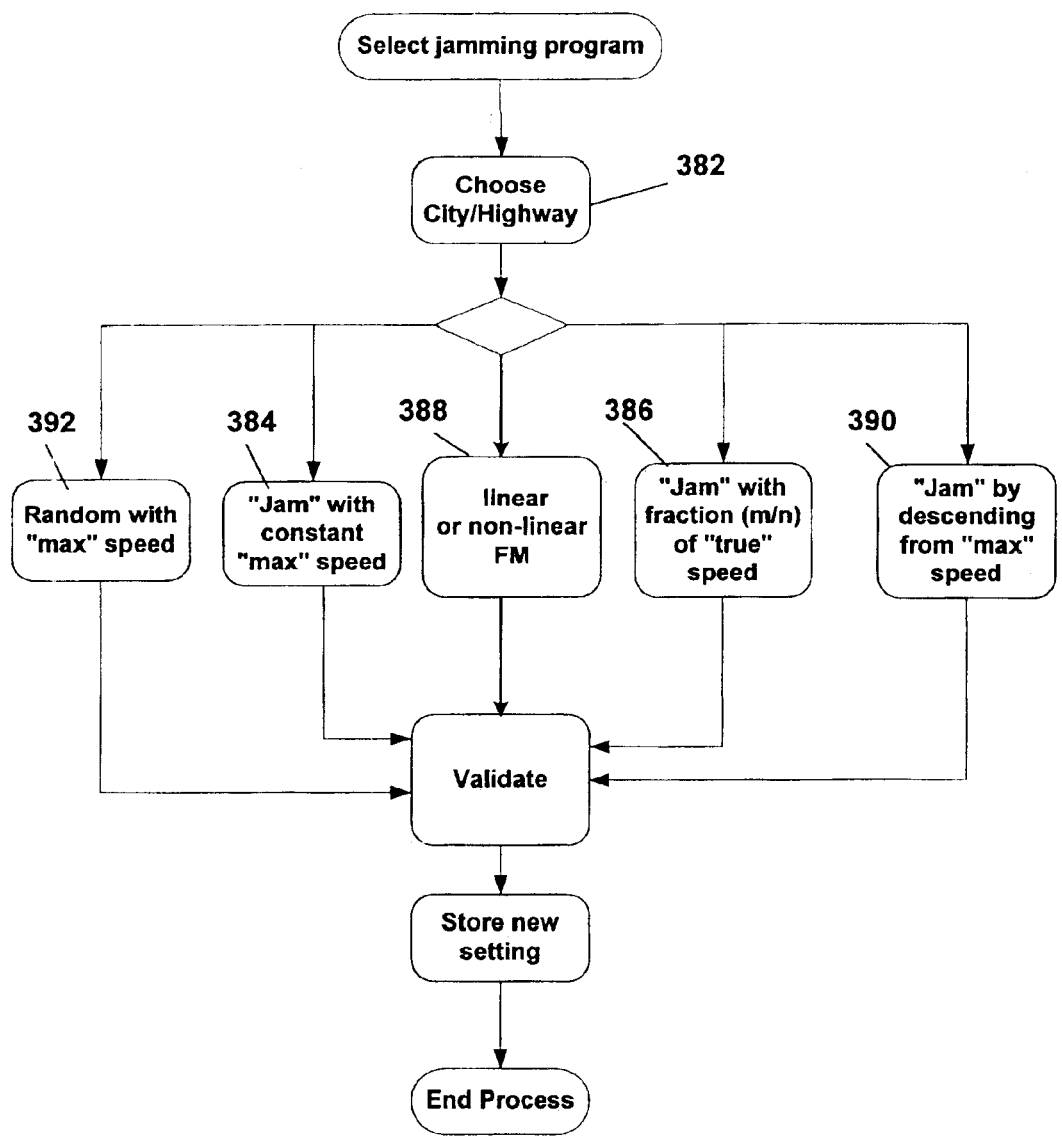
FIGS. 25 and 26 are flowcharts of the process of selecting a jamming program according to a preferred embodiment of the present invention.

FIG. 25 is a flowchart describing the Select Jamming Program. The jammer of the present invention does not simply block incoming radar signals, but deceives the radar to record a pseudo driving speed. While driving, the user can choose between two program settings—highway drive/city drive (step 382). This will determine the maximum pseudo driving speed the jamming sequence will transmit. (e.g. Max-Highway=90, Max-City=50).

The DSP chooses one of e.g. five different jamming sequences or a combination thereof, according to the track-file of the detected signal (The user may override the DSP's selection):
  i. Constant—The jammer outputs a signal showing a constant pseudo speed (step 384).
  ii. Percentage—The jammer calculates a percentage of the vehicle's actual speed (e.g. actual speed=100, pseudo speed=80) (step 386).
  iii. Use linear or non-linear FM modulation and other factory setting techniques (step 388).
  iv. Descending—Once a radar signal is detected the jammer starts by outputting the "max" speed and then gradually descends (step 390).
  v. Random with "max" speed—Jammer outputs randomly selected Doppler frequencies not exceeding the "max" speed (step 392).

It will be understood by anyone skilled in the art that other jamming sequences are also in the scope of the present invention. Any jamming technique selected may handle frequency hopping, if so indicated by the track file of the detected signal.

Figure 26:
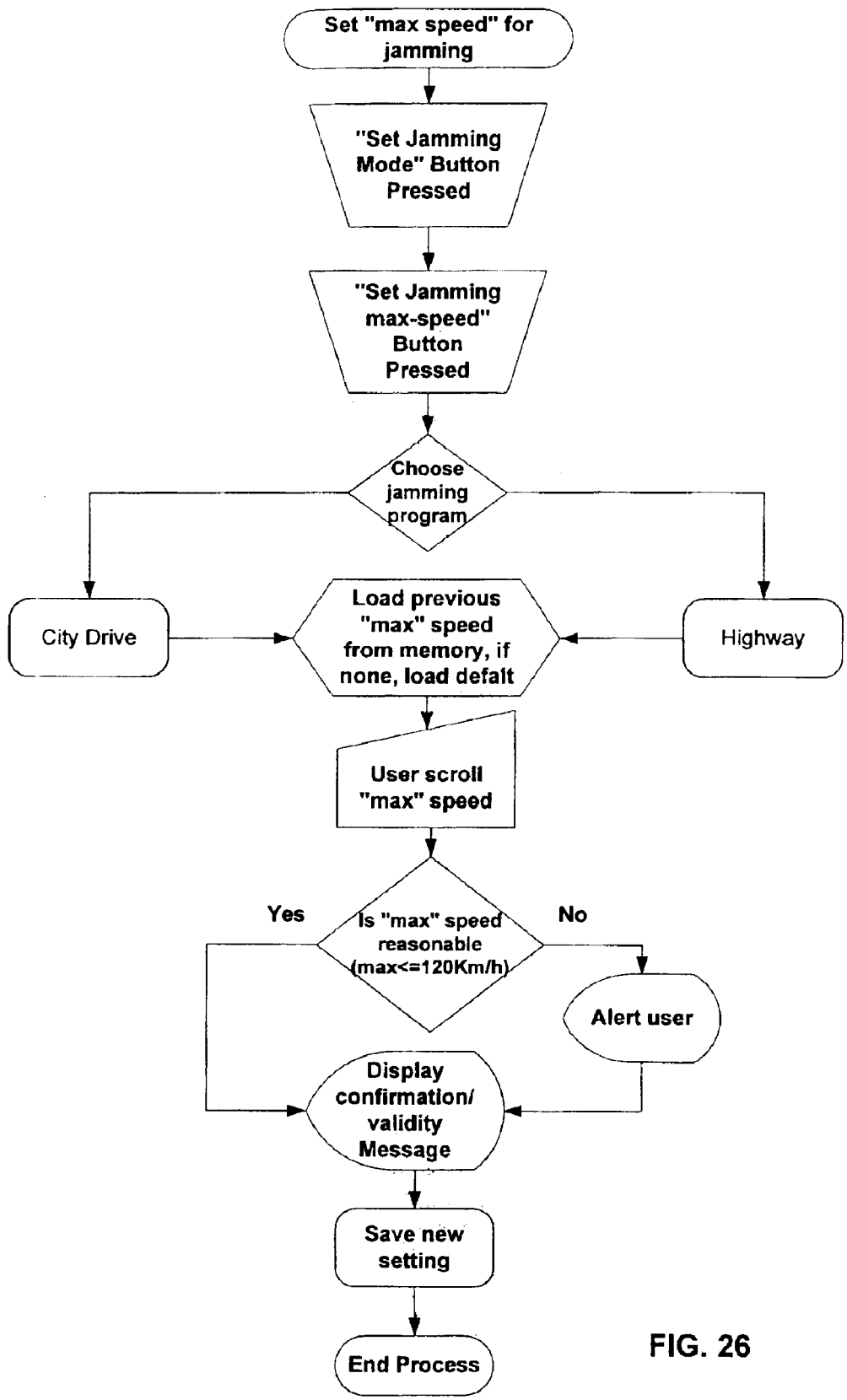

FIG. 26 is a detailed flowchart of the procedure for setting the "max" speed to be used in conjunction with the various jamming modes of FIG. 25.

The apparatus of the present invention may be used in several applications, i.e. radar detector, stand-alone transmitter or jammer. The only change needed to switch between these functions is the control and user-interface software. To allow for simple transformation between one utility to another (by a user), the apparatus may incorporate a slot adapted for a detachable memory unit. This memory unit will store a part-of or all of the systems' software, and operating instructions. This can be implemented using any type of non-volatile memory or "flash card". Alternatively, as mentioned hereinabove, the software may be downloaded from a PDA, via the Internet.

The benefits of this system structure are:
  i. Multiple software packages for different functions of the same hardware
  ii. Simple software upgrades
  iii. History—The memory can be used to record run-time data of system performance, statistical data and malfunction detection data.

To operate the system in a transmitter mode, the user selects band and frequency, using the user interface tools as described hereinabove.

Those skilled in the art will appreciate that the conception, upon which this disclosure is based, may readily be utilized as a basis for the designing of other structures, methods and systems for carrying out the several purposes of the present invention.

It is important, therefore, that the claims be regarded as including such equivalent constructions insofar as they do not depart from the spirit and scope of the present invention.

What is claimed is:

1. Apparatus for multi-band, multi-frequency signal detection and transmission, comprising:
 a multi-band wideband antenna for receiving said signals;
 a receiver, connected with said antenna, said receiver comprising:
  a plurality of low-noise amplifiers (LNAs);
  a DDS driven by a reference source;
  a plurality of synthesized down-converters, each of said plurality of down-converters connected with a respective one of said LNAs;
  a plurality of synthesized programmable multi-channel phase-locked LOs based on said DDS, wherein each of said plurality of down-converters is connected with a respective one of said synthesized prograniniable multi-channel LOs and wherein each of said LOs is synchronized with said DDS; and
  a synthesized complex I/Q phase-detector comprising an LO, said phase-detector synthesized LO based on said DDS, said phase-detector connected with said down-converters;
 a control center comprising:
  a powerful DSP;
  a memory unit connected with said DSP;
  analog-to-digital converter (ADC) connected with said I/Q phase detector and with said DSP;
  a plurality of digital-to-analog converters (DACs) connected with said DSP; and
  FPGA connected with said DSP and with said plurality of programmable synthesized receiver LOs, said FPGA additionally connected with said DDS for programming controls; and
 a multi-band transmitter comprising:
  a plurality of synthesized programmable multi-channel transmitters based on said DDS, each of said transmitters synchronized with said DDS and each of said transmitters connected with said FPGA for receiving programming controls; and
  a plurality of multi-band wide-band antennae for transmitting.

2. Apparatus for multi-band, multi-frequency signal detection and transmission, comprising:
 a multi-band wideband antenna for receiving said signals;
 a receiver, connected with said antenna, said receiver comprising:
  a plurality of low-noise amplifiers (LNAs);
  a DDS driven by a reference source;
  a plurality of synthesized down-converters, each of said plurality of down-converters connected with a respective one of said LNAs;
  a plurality of synthesized programmable multi-channel phase-locked LOs based on said DDS, wherein each of said plurality of down-converters is connected with a respective one of said synthesized programmable multi-channel LOs and wherein each of said LOs is synchronized with said DDS; and
  a synthesized complex I/Q phase-detector comprising a synthesized LO, said phase-detector synthesized LO based on said DDS, said phase-detector connected with said down-converters;
 control center comprising:
  a powerful DSP;
  a memory unit connected with said DSP;
  analog-to-digital converter (ADC) connected with said L/Q phase detector and with said DSP;
  a plurality of digital-to-analog converters (DACs) connected with said DSP; and
  FPGA connected with said DSP and with said plurality of programmable synthesized receiver LOs, said FPGA additionally connected with said DDS for programming controls; and
 a multi-band transmitter comprising:
  a plurality of multi-channel free-run VCOs, each of said VCOs connected with a respective one of said DACs for voltage tuning; and
  a plurality of multi-band wide-band antennae for transmitting.

3. Apparatus according to any one of claims 1 or 2 wherein said DSP is operable to execute a jamming program.

4. Apparatus according to claim 3 wherein said apparatus is a radar detector and jammer.

5. Apparatus according to claim 2 wherein said free-run VCOs are synchronized with said receiver LOs in a calibration process using said DSP.

6. Apparatus according to claim 2 wherein said free-run VCOs are based on FET.

7. Apparatus according any one of claims 1 or 2 wherein said DDS resides in said transmitter unit.

8. Apparatus for multi-band, multi-frequency signal detection, comprising:
 a multi-band wideband antenna for receiving said signals;
 a receiver, connected with said antenna, said receiver comprising:
  a plurality of low-noise amplifiers (LNAs);
  a DDS driven by a reference source;
  a plurality of synthesized down-converters, each of said plurality of down-converters connected with a respective one of said LNAs;
  a plurality of synthesized programmable multi-channel phase-locked LOs based on said DDS, wherein each of said plurality of down-converters is connected with a respective one of said synthesized programmable multi-channel LOs and wherein each of said LOs is synchronized with said DDS; and
  a synthesized complex I/Q phase-detector comprising an LO, said phase-detector LO based on said DDS, said phase-detector connected with said down-converters;
 a control center comprising:
  a powerful DSP;
  a memory unit connected with said DSP;
  analog-to-digital converter (ADC) connected with said I/Q phase detector and with said DSP;
  a plurality of digital-to-analog converters (DACs) connected with said DSP; and
  FPGA connected with said DSP and with said plurality of programmable receiver LOs, said FPGA additionally connected with said DDS for programming controls.

9. Apparatus according to any one of claims 1, 2 or 8 wherein said receiver unit comprises three modes of operation for detecting a signal: coarse search, fine search and acquisition.

10. Apparatus according to claim 9 wherein said coarse search comprises wideband high dynamic-range detection at 100 MHz bandwidth with −82 dBm sensitivity and wherein said coarse search may be conducted simultaneously for all required bands.

11. Apparatus according to claim 10, wherein said coarse search additionally comprises monitoring RDD activity.

12. Apparatus according to claim 9 wherein said fine search comprises detection at 100 MHz bandwidth with −98 dBm sensitivity.

13. Apparatus according to claim 9 wherein said acquisition comprises detection at 2.5 KHz bandwidth.

14. Apparatus according to claim 9, additionally composing digitally adaptive references, said references used by said three modes of operation to enhance detection accuracy.

15. Apparatus according to any one of claims 1, 2 or 8 wherein said antenna for receiving comprises a plurality of antennae; selected from the group consisting of antenna to cover the X band frequencies, antenna to cover the Ku band frequencies, antenna to cover the K band frequencies and antenna to cover the Ka band frequencies.

16. Apparatus according to claim 15 wherein said antenna is a planar/patch antenna.

17. Apparatus for multi-band, multi-frequency signal transmission, comprising:
    a control center comprising:
        a powerful DSP;
        a memory unit connected with said DSP;
        FPGA connected with said DSP;
        a DDS driven by a reference source and connected with said FPGA for programming controls; and
    a multi-band transmitter, comprising:
        a plurality of synthesized programmable multi-channel transmitters based on said DDS, each of said transmitters synchronized with said DDS and each of said transmitters connected with said FPGA for receiving programming controls; and
        a plurality of multi-band wide-band antennae for transmitting.

18. Apparatus according to claim 17 wherein said DSP is operable to execute a jamming program.

19. Apparatus according to claim 18 wherein said apparatus is a radar jammer.

20. Apparatus according to any one of claims 1, 2 or 17 wherein said antennae for transmitting are planar/patch-antennae.

21. Apparatus according to any one of claims 1, 2, or 17, additionally comprising at least one of the group consisting of a GPS device connected with said DSP, a user-interface device connected with said DSP and a detachable memory, said user-interface device selected from the group consisting of a keyboard, a display and a PDA and said detachable memory selected from the group consisting of a non-volatile memory and a flash-card.

22. Apparatus according to any one of claims 1 or 17 wherein said transmitters comprise phase-locked VCOs using fractional N division.

23. A method of detecting multi-band multi-channel signals, said method comprising the steps of:
    receiving a signal;
    down-converting said received signal to a base-band signal, wherein said base-band signal comprises a complex I and Q vector;
    converting said I and Q from analog to digital;
    processing said digital signal using FFT to locate the signal in the filtered frequency domain, said step of processing comprising the steps of:
    dividing said base-band bandwidth into F frequency sub-domains;
    repeating said step of dividing for each relevant one of said sub-domains R times; and
    following each of said dividing steps, storing information with respect to said digital signal signature.

24. A method according to claim 23, additionally comprising the step of using said stored signature for determining whether said signal is a signals of interest.

25. A method of detecting and transmitting multi-band multi-channel signals of interest, comprising the steps of:
    receiving a signal;
    down-converting said received signal to a base-band signal, wherein said base-band signal comprises a complex I and Q vector;
    converting said I and Q from analog to digital;
    processing said digital signal using FFT to locate the signal in the filtered frequency domain, said step of processing comprising the steps of:
    dividing said base-band bandwidth into F frequency sub-domains;
    repeating said step of dividing for each relevant one of said sub-domains R times; and
    following each of said dividing steps, storing information with respect to said digital signal signature;
    using said stored signature for determining whether said signal is one of said signals of interest; and
    transmitting a signal, based on said stored signature of said detected signal of interest.

26. The method according to any one of claims 24 or 25 wherein said signals of interest are radar signals.

27. A method according to any one of claims 24 or 25 wherein said signal of interest are determined regionally.

28. A method according to any one of claims 23 or 25 wherein said digital signal signature comprises:
    frequency, amplitude, frequency rate change, complex I/Q vector direction, last update time and lock quality.

29. A method according to claim 25 wherein said step of transmitting comprises the steps of:
    setting a maximum speed for jamming; and
    selecting a jamming mode.

30. A method according to claim 29 wherein said jamming mode comprises at least one of the group consisting of random, constant, FM modulation, fraction and descending modes and wherein said random mode comprises transmitting a random frequency not higher than said maximum speed frequency;
    said constant mode comprises transmitting a constant frequency not higher than said maximum speed frequency;
    said FM modulation mode comprises transmitting a linearly or non-linearly modulated frequency not higher than said maximum speed frequency;
    said fraction mode comprises transmitting a fraction of the real speed frequency; and
    said descending mode comprises transmitting a descending frequency, said descending frequency starting at said maximum speed frequency.

31. A method according to claim 30 wherein said descending mode additionally comprises alternately transmitting an ascending frequency.

32. A method according to claim 30 wherein each of said jamming modes comprises frequency hopping.

* * * * *

UNITED STATES PATENT AND TRADEMARK OFFICE
CERTIFICATE OF CORRECTION

| | | |
|---|---|---|
| PATENT NO. | : 7,023,374 B2 | Page 1 of 1 |
| APPLICATION NO. | : 10/491450 | |
| DATED | : April 4, 2006 | |
| INVENTOR(S) | : Abraham Jossef et al. | |

It is certified that error appears in the above-identified patent and that said Letters Patent is hereby corrected as shown below:

In the Specification:

Column 16, Line 25, "The DSP" should start a new paragraph ;

In the Claims:

Claim 1 at Column 23, Lines 18-19, change "prograniniable" to --programmable--;

Claim 2 at Column 24, Line 2, change "L/Q" to --I/Q-- ;

Claim 12 at Column 25, Line 2, change "100" to --10-- ;

Claim 14 at Column 25, Lines 6-7, change "composing" to --comprising-- .

Signed and Sealed this

Nineteenth Day of September, 2006

JON W. DUDAS
*Director of the United States Patent and Trademark Office*